United States Patent
Heslin et al.

(10) Patent No.: US 8,134,117 B2
(45) Date of Patent: *Mar. 13, 2012

(54) VEHICULAR HAVING A CAMERA, A RAIN SENSOR AND A SINGLE-BALL INTERIOR ELECTROCHROMIC MIRROR ASSEMBLY ATTACHED AT AN ATTACHMENT ELEMENT

(75) Inventors: Patrick Heslin, Dublin (IE); Niall R. Lynam, Holland, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/191,802

(22) Filed: Jul. 27, 2011

(65) Prior Publication Data

US 2011/0278439 A1    Nov. 17, 2011

Related U.S. Application Data

(63) Continuation of application No. 13/026,591, filed on Feb. 14, 2011, now Pat. No. 7,994,471, which is a continuation of application No. 12/467,660, filed on May 18, 2009, now Pat. No. 7,888,629, which is a continuation of application No. 12/197,660, filed on Aug. 25, 2008, now Pat. No. 7,538,316, which is a continuation of application No. 11/828,880, filed on Jul. 26, 2007, now Pat. No. 7,420,159, which is a continuation of application No. 11/699,271, filed on Jan. 29, 2007, now Pat. No. 7,265,342, which is a continuation of application No. 11/418,906, filed on May 5, 2006, now Pat. No. 7,262,406, which is a continuation of application No. 10/913,748, filed on Aug. 6, 2004, now Pat. No. 7,041,965, which is a continuation of application No. 10/618,334, filed on Jul. 11, 2003, now Pat. No. 6,774,356, which is a continuation of application No. 09/997,579, filed on Nov. 29, 2001, now Pat. No. 6,593,565, which is a continuation of application No. 09/433,467, filed on Nov. 4, 1999, now Pat. No. 6,326,613, which is a continuation-in-part of application No. 09/003,966, filed on Jan. 7, 1998, now Pat. No. 6,250,148.

(51) Int. Cl.
*H01J 5/02* (2006.01)
(52) U.S. Cl. .................................... 250/239; 250/208.1
(58) Field of Classification Search .................. 250/239, 250/208.1, 216, 227.25; 359/229–242; 340/461, 340/485, 602
See application file for complete search history.

(56) References Cited

U.S. PATENT DOCUMENTS 1,096,452 A    5/1914   Perrin
(Continued)

FOREIGN PATENT DOCUMENTS

AU    A-40317/95    2/1995
(Continued)

OTHER PUBLICATIONS

Stewart, James W.; HP SnapLED: LED Assemblies for Automotive Signal Applications; Nov. 1, 1998; Hewlett-Packard Journal; vol. 50, No. 1, www.hpl.hp.com/hpjournal/98nov/nov98al.pdf.

(Continued)

*Primary Examiner* — Que T Le
(74) *Attorney, Agent, or Firm* — Gardner, Linn, Burkhart & Flory, LLP

(57) ABSTRACT

A vehicular interior rearview mirror system includes an attachment element attached at an in-cabin surface of a vehicle windshield and an interior rearview mirror assembly that includes a mount for attaching the mirror assembly to the attachment element, a housing, a single ball and socket pivot joint, and an interior rearview mirror head adjustable by a driver of the vehicle about the single pivot joint to adjust a rearward field of view. The housing houses a forwardly-viewing camera and, with the interior rearview mirror assembly attached at the attachment element, the forwardly-viewing camera views through the vehicle windshield. The attachment element is a mirror mounting button and a rain sensor is disposed at an inner open central portion of the mirror mounting button and views, via the inner open central portion of the mirror mounting button, through the vehicle windshield.

81 Claims, 5 Drawing Sheets

U.S. PATENT DOCUMENTS

| | | |
|---|---|---|
| 1,563,258 A | 11/1925 | Cunningham |
| 2,069,368 A | 2/1937 | Horinstein |
| 2,166,303 A | 7/1939 | Hodny et al. |
| 2,263,382 A | 11/1941 | Gotzinger |
| 2,414,223 A | 1/1947 | DeVirgilis |
| 2,457,348 A | 12/1948 | Chambers |
| 2,561,582 A | 7/1951 | Marbel |
| 2,580,014 A | 12/1951 | Gazda |
| 3,004,473 A | 10/1961 | Arthur et al. |
| 3,075,430 A | 1/1963 | Woodward et al. |
| 3,141,393 A | 7/1964 | Platt |
| 3,152,216 A | 10/1964 | Woodward |
| 3,162,008 A | 12/1964 | Berger et al. |
| 3,185,020 A | 5/1965 | Thelen |
| 3,266,016 A | 8/1966 | Maruyama et al. |
| 3,280,701 A | 10/1966 | Donnelly et al. |
| 3,432,225 A | 3/1969 | Rock |
| 3,451,741 A | 6/1969 | Manos |
| 3,453,038 A | 7/1969 | Kissa et al. |
| 3,467,465 A | 9/1969 | Van Noord |
| 3,473,867 A | 10/1969 | Byrnes |
| 3,480,781 A | 11/1969 | Mandalakas |
| 3,499,112 A | 3/1970 | Heilmeier et al. |
| 3,499,702 A | 3/1970 | Goldmacher et al. |
| 3,521,941 A | 7/1970 | Deb et al. |
| 3,543,018 A | 11/1970 | Barcus et al. |
| 3,557,265 A | 1/1971 | Chisholm et al. |
| 3,565,985 A | 2/1971 | Schrenk et al. |
| 3,612,654 A | 10/1971 | Klein |
| 3,614,210 A | 10/1971 | Caplan |
| 3,628,851 A | 12/1971 | Robertson |
| 3,676,668 A | 7/1972 | Collins et al. |
| 3,680,951 A | 8/1972 | Jordan et al. |
| 3,689,695 A | 9/1972 | Rosenfield et al. |
| 3,711,176 A | 1/1973 | Alfrey, Jr. et al. |
| 3,712,710 A | 1/1973 | Castellion et al. |
| 3,748,017 A | 7/1973 | Yamamura et al. |
| 3,781,090 A | 12/1973 | Sumita |
| 3,806,229 A | 4/1974 | Schoot et al. |
| 3,807,832 A | 4/1974 | Castellion |
| 3,807,833 A | 4/1974 | Graham et al. |
| 3,821,590 A | 6/1974 | Kosman et al. |
| 3,837,129 A | 9/1974 | Losell |
| 3,860,847 A | 1/1975 | Carley |
| 3,862,798 A | 1/1975 | Hopkins |
| 3,870,404 A | 3/1975 | Wilson et al. |
| 3,876,287 A | 4/1975 | Sprokel |
| 3,932,024 A | 1/1976 | Yaguchi et al. |
| 3,940,822 A | 3/1976 | Emerick et al. |
| 3,956,017 A | 5/1976 | Shigemasa |
| 3,978,190 A | 8/1976 | Kurz, Jr. et al. |
| 3,985,424 A | 10/1976 | Steinacher |
| 4,006,546 A | 2/1977 | Anderson et al. |
| 4,035,681 A | 7/1977 | Savage |
| 4,040,727 A | 8/1977 | Ketchpel |
| 4,052,712 A | 10/1977 | Ohama et al. |
| 4,075,468 A | 2/1978 | Marcus |
| 4,088,400 A | 5/1978 | Assouline et al. |
| 4,093,364 A | 6/1978 | Miller |
| 4,097,131 A | 6/1978 | Nishiyama |
| 4,109,235 A | 8/1978 | Bouthors |
| 4,139,234 A | 2/1979 | Morgan |
| 4,159,866 A | 7/1979 | Wunsch et al. |
| 4,161,653 A | 7/1979 | Bedini et al. |
| 4,171,875 A | 10/1979 | Taylor et al. |
| 4,174,152 A | 11/1979 | Gilia et al. |
| 4,200,361 A | 4/1980 | Malvano et al. |
| 4,202,607 A | 5/1980 | Washizuka et al. |
| 4,211,955 A | 7/1980 | Ray |
| 4,214,266 A | 7/1980 | Myers |
| 4,219,760 A | 8/1980 | Ferro |
| 4,221,955 A | 9/1980 | Joslyn |
| 4,228,490 A | 10/1980 | Thillays |
| 4,247,870 A | 1/1981 | Gabel et al. |
| 4,257,703 A | 3/1981 | Goodrich |
| 4,274,078 A | 6/1981 | Isobe et al. |
| 4,277,804 A | 7/1981 | Robison |
| 4,281,899 A | 8/1981 | Oskam |
| 4,288,814 A | 9/1981 | Talley et al. |
| RE30,835 E | 12/1981 | Giglia |
| 4,306,768 A | 12/1981 | Egging |
| 4,310,851 A | 1/1982 | Pierrat |
| 4,319,806 A * | 3/1982 | Brandenburg ................ 359/606 |
| 4,331,382 A | 5/1982 | Graff |
| 4,338,000 A | 7/1982 | Kamimori et al. |
| 4,377,613 A | 3/1983 | Gordon |
| 4,398,805 A | 8/1983 | Cole |
| 4,419,386 A | 12/1983 | Gordon |
| 4,420,238 A | 12/1983 | Felix |
| 4,425,717 A | 1/1984 | Marcus |
| 4,435,042 A | 3/1984 | Wood et al. |
| 4,435,048 A | 3/1984 | Kamimori et al. |
| 4,436,371 A | 3/1984 | Wood et al. |
| 4,438,348 A | 3/1984 | Casper et al. |
| 4,443,057 A | 4/1984 | Bauer et al. |
| 4,446,171 A | 5/1984 | Thomas |
| 4,465,339 A | 8/1984 | Baucke et al. |
| 4,473,695 A | 9/1984 | Wrighton et al. |
| 4,490,227 A | 12/1984 | Bitter |
| 4,491,390 A | 1/1985 | Tong-Shen |
| 4,499,451 A | 2/1985 | Suzuki et al. |
| 4,521,079 A | 6/1985 | Leenhouts et al. |
| 4,524,941 A | 6/1985 | Wood et al. |
| 4,538,063 A | 8/1985 | Bulat |
| 4,546,551 A | 10/1985 | Franks |
| 4,555,694 A | 11/1985 | Yanagishima et al. |
| 4,561,625 A | 12/1985 | Weaver |
| 4,572,619 A | 2/1986 | Reininger et al. |
| 4,580,196 A | 4/1986 | Task |
| 4,580,875 A | 4/1986 | Bechtel et al. |
| 4,581,827 A | 4/1986 | Higashi |
| 4,588,267 A | 5/1986 | Pastore |
| 4,603,946 A | 8/1986 | Kato et al. |
| 4,623,222 A | 11/1986 | Itoh et al. |
| 4,625,210 A | 11/1986 | Sagl |
| 4,626,850 A | 12/1986 | Chey |
| 4,630,040 A | 12/1986 | Haertling |
| 4,630,109 A | 12/1986 | Barton |
| 4,630,904 A | 12/1986 | Pastore |
| 4,634,835 A | 1/1987 | Suzuki |
| 4,635,033 A | 1/1987 | Inukai et al. |
| 4,636,782 A | 1/1987 | Nakamura et al. |
| 4,638,287 A | 1/1987 | Umebayashi et al. |
| 4,646,210 A | 2/1987 | Skogler et al. |
| 4,652,090 A | 3/1987 | Uchikawa et al. |
| 4,655,549 A | 4/1987 | Suzuki et al. |
| 4,665,311 A | 5/1987 | Cole |
| 4,665,430 A | 5/1987 | Hiroyasu |
| 4,669,827 A | 6/1987 | Fukada et al. |
| 4,671,615 A | 6/1987 | Fukada et al. |
| 4,671,619 A | 6/1987 | Kamimori et al. |
| 4,678,281 A | 7/1987 | Bauer |
| 4,679,906 A | 7/1987 | Brandenburg |
| 4,682,083 A | 7/1987 | Alley |
| 4,692,798 A | 9/1987 | Seko et al. |
| 4,694,295 A | 9/1987 | Miller et al. |
| 4,697,883 A | 10/1987 | Suzuki et al. |
| 4,701,022 A | 10/1987 | Jacob |
| 4,702,566 A | 10/1987 | Tukude et al. |
| 4,711,544 A | 12/1987 | Iino et al. |
| 4,712,879 A | 12/1987 | Lynam et al. |
| 4,713,685 A | 12/1987 | Nishimura et al. |
| RE32,576 E | 1/1988 | Pastore |
| 4,718,756 A | 1/1988 | Lancaster |
| 4,721,364 A | 1/1988 | Itoh et al. |
| 4,729,068 A | 3/1988 | Ohe |
| 4,729,076 A | 3/1988 | Masami et al. |
| 4,731,669 A | 3/1988 | Hayashi et al. |
| 4,733,335 A | 3/1988 | Serizawa et al. |
| 4,733,336 A | 3/1988 | Skogler et al. |
| 4,740,838 A | 4/1988 | Mase et al. |
| 4,761,061 A | 8/1988 | Nishiyama et al. |
| 4,773,740 A | 9/1988 | Kawakami et al. |
| 4,780,752 A | 10/1988 | Angerstein et al. |
| 4,781,436 A | 11/1988 | Armbruster |
| 4,789,904 A | 12/1988 | Peterson |
| 4,793,690 A | 12/1988 | Gahan et al. |

| | | |
|---|---|---|
| 4,793,695 A | 12/1988 | Wada et al. |
| 4,794,261 A | 12/1988 | Rosen |
| D299,491 S | 1/1989 | Masuda |
| 4,799,768 A | 1/1989 | Gahan |
| 4,803,599 A | 2/1989 | Trine et al. |
| 4,807,096 A | 2/1989 | Skogler et al. |
| 4,820,933 A | 4/1989 | Hong et al. |
| 4,825,232 A | 4/1989 | Howdle |
| 4,826,289 A | 5/1989 | Vandenbrink et al. |
| 4,827,086 A | 5/1989 | Rockwell |
| 4,837,551 A | 6/1989 | Iino |
| 4,842,378 A | 6/1989 | Flasck et al. |
| 4,845,402 A | 7/1989 | Smith |
| 4,847,772 A | 7/1989 | Michalopoulos et al. |
| 4,855,161 A | 8/1989 | Moser et al. |
| 4,855,550 A | 8/1989 | Schultz, Jr. |
| 4,859,813 A | 8/1989 | Rockwell |
| 4,859,867 A | 8/1989 | Larson et al. |
| 4,860,171 A | 8/1989 | Kojima |
| 4,862,594 A | 9/1989 | Schierbeek et al. |
| 4,871,917 A | 10/1989 | O'Farrell et al. |
| 4,872,051 A | 10/1989 | Dye |
| 4,882,466 A | 11/1989 | Friel |
| 4,882,565 A | 11/1989 | Gallmeyer |
| 4,883,349 A | 11/1989 | Mittelhäuser |
| 4,884,135 A | 11/1989 | Schiffman |
| 4,886,960 A | 12/1989 | Molyneux et al. |
| 4,889,412 A | 12/1989 | Clerc et al. |
| 4,891,828 A | 1/1990 | Kawazoe |
| 4,892,345 A | 1/1990 | Rachael, III |
| 4,902,103 A | 2/1990 | Miyake et al. |
| 4,902,108 A | 2/1990 | Byker |
| 4,906,085 A | 3/1990 | Sugihara et al. |
| 4,909,606 A | 3/1990 | Wada et al. |
| 4,910,591 A | 3/1990 | Petrossian et al. |
| 4,916,374 A | 4/1990 | Schierbeek et al. |
| 4,917,477 A | 4/1990 | Bechtel et al. |
| 4,926,170 A | 5/1990 | Beggs et al. |
| 4,930,742 A | 6/1990 | Schofield et al. |
| 4,933,814 A | 6/1990 | Sanai |
| 4,935,665 A | 6/1990 | Murata |
| 4,936,533 A | 6/1990 | Adams et al. |
| 4,937,796 A | 6/1990 | Tendler |
| 4,937,945 A | 7/1990 | Schofield et al. |
| 4,943,796 A | 7/1990 | Lee |
| 4,948,242 A | 8/1990 | Desmond et al. |
| 4,953,305 A | 9/1990 | Van Lente et al. |
| 4,956,591 A | 9/1990 | Schierbeek et al. |
| 4,957,349 A | 9/1990 | Clerc et al. |
| 4,959,247 A | 9/1990 | Moser et al. |
| 4,959,865 A | 9/1990 | Stettiner et al. |
| 4,970,653 A | 11/1990 | Kenue |
| 4,973,844 A | 11/1990 | O'Farrell et al. |
| 4,974,122 A | 11/1990 | Shaw |
| 4,978,196 A | 12/1990 | Suzuki et al. |
| 4,983,951 A | 1/1991 | Igarashi et al. |
| 4,985,809 A | 1/1991 | Matsui et al. |
| 4,987,357 A | 1/1991 | Masaki |
| 4,996,083 A | 2/1991 | Moser et al. |
| 5,001,386 A | 3/1991 | Sullivan et al. |
| 5,001,558 A | 3/1991 | Burley et al. |
| 5,005,213 A | 4/1991 | Hanson et al. |
| 5,006,971 A | 4/1991 | Jerkins |
| 5,014,167 A | 5/1991 | Roberts |
| 5,016,988 A | 5/1991 | Iimura |
| 5,016,996 A | 5/1991 | Ueno |
| 5,017,903 A | 5/1991 | Krippelz, Sr. |
| 5,018,839 A | 5/1991 | Yamamoto et al. |
| 5,027,200 A | 6/1991 | Petrossian et al. |
| 5,037,182 A | 8/1991 | Groves et al. |
| 5,038,255 A | 8/1991 | Nishihashi et al. |
| 5,052,163 A | 10/1991 | Czekala |
| 5,056,899 A | 10/1991 | Warszawski |
| 5,057,974 A | 10/1991 | Mizobe |
| 5,058,851 A | 10/1991 | Lawlor et al. |
| 5,059,015 A | 10/1991 | Tran |
| 5,066,108 A | 11/1991 | McDonald |
| 5,066,112 A | 11/1991 | Lynam et al. |
| 5,069,535 A | 12/1991 | Baucke et al. |
| 5,070,323 A | 12/1991 | Iino et al. |
| 5,073,012 A | 12/1991 | Lynam |
| 5,076,673 A | 12/1991 | Lynam et al. |
| 5,076,674 A | 12/1991 | Lynam |
| 5,078,480 A | 1/1992 | Warszawski |
| 5,096,287 A | 3/1992 | Kakinami et al. |
| 5,100,095 A | 3/1992 | Haan et al. |
| 5,101,139 A | 3/1992 | Lechter |
| 5,105,127 A | 4/1992 | Lavaud et al. |
| 5,115,346 A | 5/1992 | Lynam |
| 5,117,346 A | 5/1992 | Gard |
| 5,119,220 A | 6/1992 | Narita et al. |
| 5,121,200 A | 6/1992 | Choi |
| 5,122,619 A | 6/1992 | Dlubak |
| 5,123,077 A | 6/1992 | Endo et al. |
| 5,124,845 A | 6/1992 | Shimojo |
| 5,124,890 A | 6/1992 | Choi et al. |
| 5,128,799 A | 7/1992 | Byker |
| 5,130,898 A | 7/1992 | Akahane |
| 5,131,154 A | 7/1992 | Schierbeek et al. |
| 5,134,507 A | 7/1992 | Ishii |
| 5,134,549 A | 7/1992 | Yokoyama |
| 5,135,298 A | 8/1992 | Feltman |
| 5,136,483 A | 8/1992 | Schöniger et al. |
| 5,140,455 A | 8/1992 | Varaprasad et al. |
| 5,140,465 A | 8/1992 | Yasui et al. |
| 5,142,407 A | 8/1992 | Varaprasad et al. |
| 5,145,609 A | 9/1992 | Varaprasad et al. |
| 5,148,306 A | 9/1992 | Yamada et al. |
| 5,150,232 A | 9/1992 | Gunkima et al. |
| 5,151,816 A | 9/1992 | Varaprasad et al. |
| 5,151,824 A | 9/1992 | O'Farrell |
| 5,154,617 A | 10/1992 | Suman et al. |
| 5,158,638 A | 10/1992 | Osanami et al. |
| 5,160,200 A | 11/1992 | Cheselske |
| 5,160,201 A | 11/1992 | Wrobel |
| 5,168,378 A | 12/1992 | Black et al. |
| 5,173,881 A | 12/1992 | Sindle |
| 5,177,031 A | 1/1993 | Buchmann et al. |
| 5,178,448 A | 1/1993 | Adams et al. |
| 5,179,471 A | 1/1993 | Caskey et al. |
| 5,183,099 A | 2/1993 | Bechu |
| 5,184,956 A | 2/1993 | Langlarais et al. |
| 5,189,537 A | 2/1993 | O'Farrell |
| 5,193,029 A | 3/1993 | Schofield et al. |
| 5,197,562 A | 3/1993 | Kakinami et al. |
| 5,202,950 A | 4/1993 | Arego et al. |
| 5,207,492 A | 5/1993 | Roberts |
| 5,210,967 A | 5/1993 | Brown |
| 5,212,819 A | 5/1993 | Wada |
| 5,214,408 A | 5/1993 | Asayama |
| 5,217,794 A | 6/1993 | Schrenk |
| 5,223,814 A | 6/1993 | Suman |
| 5,223,844 A | 6/1993 | Mansell et al. |
| 5,229,975 A | 7/1993 | Truesdell et al. |
| 5,230,400 A | 7/1993 | Kakinama et al. |
| 5,233,461 A | 8/1993 | Dornan et al. |
| 5,235,316 A | 8/1993 | Qualizza |
| 5,239,405 A | 8/1993 | Varaprasad et al. |
| 5,239,406 A | 8/1993 | Lynam |
| 5,243,417 A | 9/1993 | Pollard |
| 5,245,422 A | 9/1993 | Borcherts et al. |
| 5,252,354 A | 10/1993 | Cronin et al. |
| 5,253,109 A | 10/1993 | O'Farrell et al. |
| 5,255,442 A | 10/1993 | Schierbeek et al. |
| 5,260,626 A | 11/1993 | Takase et al. |
| 5,277,986 A | 1/1994 | Cronin et al. |
| 5,280,555 A | 1/1994 | Ainsburg |
| 5,285,060 A | 2/1994 | Larson et al. |
| 5,289,321 A | 2/1994 | Secor |
| 5,296,924 A | 3/1994 | de Saint Blancard et al. |
| 5,303,075 A | 4/1994 | Wada et al. |
| 5,303,205 A | 4/1994 | Gauthier et al. |
| 5,304,980 A | 4/1994 | Maekawa |
| 5,305,012 A | 4/1994 | Faris |
| 5,307,136 A | 4/1994 | Saneyoshi |
| 5,313,335 A | 5/1994 | Gray et al. |
| 5,325,096 A | 6/1994 | Pakett |
| 5,325,386 A | 6/1994 | Jewell et al. |

| Patent | Kind | Date | Inventor |
|---|---|---|---|
| 5,327,288 | A | 7/1994 | Wellington et al. |
| 5,330,149 | A | 7/1994 | Haan et al. |
| 5,331,312 | A | 7/1994 | Kudoh |
| 5,331,358 | A | 7/1994 | Schurle et al. |
| 5,339,075 | A | 8/1994 | Abst et al. |
| 5,339,529 | A | 8/1994 | Lindberg |
| 5,341,437 | A | 8/1994 | Nakayama |
| D351,370 | S | 10/1994 | Lawlor et al. |
| 5,354,965 | A | 10/1994 | Lee |
| 5,355,118 | A | 10/1994 | Fukuhara |
| 5,355,245 | A | 10/1994 | Lynam |
| 5,355,284 | A | 10/1994 | Roberts |
| 5,361,190 | A | 11/1994 | Roberts et al. |
| 5,363,294 | A | 11/1994 | Yamamoto et al. |
| 5,371,659 | A | 12/1994 | Pastrick et al. |
| 5,373,482 | A | 12/1994 | Gauthier |
| 5,379,146 | A | 1/1995 | Defendini |
| 5,386,285 | A | 1/1995 | Asayama |
| 5,386,306 | A | 1/1995 | Gunjima et al. |
| 5,400,158 | A | 3/1995 | Ohnishi et al. |
| 5,402,103 | A | 3/1995 | Tashiro |
| 5,406,395 | A | 4/1995 | Wilson et al. |
| 5,406,414 | A | 4/1995 | O'Farrell et al. |
| 5,408,353 | A | 4/1995 | Nichols et al. |
| 5,408,357 | A | 4/1995 | Beukema |
| 5,410,346 | A | 4/1995 | Saneyoshi et al. |
| 5,414,439 | A | 5/1995 | Groves et al. |
| 5,414,461 | A | 5/1995 | Kishi et al. |
| 5,416,313 | A | 5/1995 | Larson et al. |
| 5,416,478 | A | 5/1995 | Morinaga |
| 5,418,610 | A | 5/1995 | Fischer |
| 5,422,756 | A | 6/1995 | Weber |
| 5,424,726 | A | 6/1995 | Beymer |
| 5,424,865 | A | 6/1995 | Lynam |
| 5,424,952 | A | 6/1995 | Asayama |
| 5,426,524 | A | 6/1995 | Wada et al. |
| 5,430,431 | A | 7/1995 | Nelson |
| 5,432,496 | A | 7/1995 | Lin |
| 5,432,626 | A | 7/1995 | Sasuga et al. |
| 5,436,741 | A | 7/1995 | Crandall |
| 5,437,931 | A | 8/1995 | Tsai et al. |
| 5,439,305 | A | 8/1995 | Santo |
| 5,444,478 | A | 8/1995 | Lelong et al. |
| 5,446,576 | A | 8/1995 | Lynam et al. |
| 5,455,716 | A | 10/1995 | Suman et al. |
| 5,461,361 | A | 10/1995 | Moore |
| D363,920 | S | 11/1995 | Roberts et al. |
| 5,469,298 | A | 11/1995 | Suman et al. |
| 5,475,366 | A | 12/1995 | Van Lente et al. |
| 5,475,494 | A | 12/1995 | Nishida et al. |
| 5,481,409 | A | 1/1996 | Roberts |
| 5,483,453 | A | 1/1996 | Uemura et al. |
| 5,485,161 | A | 1/1996 | Vaughn |
| 5,485,378 | A | 1/1996 | Franke et al. |
| 5,487,522 | A | 1/1996 | Hook |
| 5,488,496 | A | 1/1996 | Pine |
| 5,497,305 | A | 3/1996 | Pastrick et al. |
| 5,497,306 | A | 3/1996 | Pastrick |
| 5,500,760 | A | 3/1996 | Varaprasad et al. |
| 5,506,701 | A | 4/1996 | Ichikawa |
| 5,509,606 | A | 4/1996 | Breithaupt et al. |
| 5,510,983 | A | 4/1996 | Iino |
| 5,515,448 | A | 5/1996 | Nishitani |
| 5,519,621 | A | 5/1996 | Worthman |
| 5,521,744 | A | 5/1996 | Mazurek |
| 5,521,760 | A | 5/1996 | DeYoung et al. |
| 5,523,811 | A | 6/1996 | Wada et al. |
| 5,523,877 | A | 6/1996 | Lynam |
| 5,525,264 | A | 6/1996 | Cronin et al. |
| 5,525,977 | A | 6/1996 | Suman |
| 5,528,422 | A | 6/1996 | Roberts |
| 5,528,474 | A | 6/1996 | Roney et al. |
| 5,529,138 | A | 6/1996 | Shaw et al. |
| 5,530,240 | A | 6/1996 | Larson et al. |
| 5,530,420 | A | 6/1996 | Tsuchiya et al. |
| 5,530,421 | A | 6/1996 | Marshall et al. |
| 5,535,056 | A | 7/1996 | Caskey et al. |
| 5,535,144 | A | 7/1996 | Kise |
| 5,539,397 | A | 7/1996 | Asanuma et al. |
| 5,541,590 | A | 7/1996 | Nishio |
| 5,550,677 | A | 8/1996 | Schofield et al. |
| 5,555,172 | A | 9/1996 | Potter |
| 5,561,333 | A | 10/1996 | Darius |
| 5,566,224 | A | 10/1996 | ul Azam et al. |
| 5,567,360 | A | 10/1996 | Varaprasad et al. |
| 5,568,316 | A | 10/1996 | Schrenck et al. |
| 5,570,127 | A | 10/1996 | Schmidt |
| 5,572,354 | A | 11/1996 | Desmond et al. |
| 5,574,426 | A | 11/1996 | Shisgal et al. |
| 5,574,443 | A | 11/1996 | Hsieh |
| 5,575,552 | A | 11/1996 | Faloon et al. |
| 5,576,687 | A | 11/1996 | Blank et al. |
| 5,576,854 | A | 11/1996 | Schmidt et al. |
| 5,576,975 | A | 11/1996 | Sasaki et al. |
| 5,578,404 | A | 11/1996 | Kliem |
| 5,587,236 | A | 12/1996 | Agrawal et al. |
| 5,587,699 | A | 12/1996 | Faloon et al. |
| 5,593,221 | A | 1/1997 | Evanicky et al. |
| 5,594,222 | A | 1/1997 | Caldwell |
| 5,594,560 | A | 1/1997 | Jelley et al. |
| 5,594,615 | A | 1/1997 | Spijkerman et al. |
| 5,602,542 | A | 2/1997 | Widmann et al. |
| 5,602,670 | A | 2/1997 | Keegan |
| 5,608,550 | A | 3/1997 | Epstein et al. |
| 5,609,652 | A | 3/1997 | Yamada et al. |
| 5,610,380 | A | 3/1997 | Nicolaisen |
| 5,610,756 | A | 3/1997 | Lynam et al. |
| 5,611,966 | A | 3/1997 | Varaprasad et al. |
| 5,614,885 | A | 3/1997 | Van Lente et al. |
| 5,615,023 | A | 3/1997 | Yang |
| 5,615,857 | A | 4/1997 | Hook |
| 5,617,085 | A | 4/1997 | Tsutsumi et al. |
| 5,619,374 | A | 4/1997 | Roberts |
| 5,619,375 | A | 4/1997 | Roberts |
| 5,626,800 | A | 5/1997 | Williams et al. |
| 5,631,089 | A | 5/1997 | Center, Jr. et al. |
| 5,631,638 | A | 5/1997 | Kaspar et al. |
| 5,631,639 | A | 5/1997 | Hibino et al. |
| 5,632,092 | A | 5/1997 | Blank et al. |
| 5,632,551 | A | 5/1997 | Roney et al. |
| 5,634,709 | A | 6/1997 | Iwama |
| 5,640,216 | A | 6/1997 | Hasegawa et al. |
| 5,642,238 | A | 6/1997 | Sala |
| 5,644,851 | A | 7/1997 | Blank et al. |
| 5,646,614 | A | 7/1997 | Abersfelder et al. |
| 5,649,756 | A | 7/1997 | Adams et al. |
| 5,649,758 | A | 7/1997 | Dion |
| 5,650,765 | A | 7/1997 | Park |
| 5,650,929 | A | 7/1997 | Potter et al. |
| 5,661,455 | A | 8/1997 | Van Lente et al. |
| 5,661,651 | A | 8/1997 | Geschke et al. |
| 5,661,804 | A | 8/1997 | Dykema et al. |
| 5,662,375 | A | 9/1997 | Adams et al. |
| 5,666,157 | A | 9/1997 | Aviv |
| 5,667,289 | A | 9/1997 | Akahane et al. |
| 5,668,663 | A | 9/1997 | Varaprasad et al. |
| 5,668,675 | A | 9/1997 | Fredricks |
| 5,669,698 | A | 9/1997 | Veldman et al. |
| 5,669,699 | A | 9/1997 | Pastrick et al. |
| 5,669,704 | A | 9/1997 | Pastrick |
| 5,669,705 | A | 9/1997 | Pastrick et al. |
| 5,670,935 | A | 9/1997 | Schofield et al. |
| 5,671,996 | A | 9/1997 | Bos et al. |
| 5,673,994 | A | 10/1997 | Fant, Jr. et al. |
| 5,673,999 | A | 10/1997 | Koenck |
| 5,677,598 | A | 10/1997 | De Hair et al. |
| 5,679,283 | A | 10/1997 | Tonar et al. |
| 5,680,123 | A | 10/1997 | Lee |
| 5,680,245 | A | 10/1997 | Lynam |
| 5,680,263 | A | 10/1997 | Zimmermann et al. |
| 5,686,975 | A | 11/1997 | Lipton |
| 5,686,979 | A | 11/1997 | Weber et al. |
| 5,689,241 | A | 11/1997 | Clark, Sr. et al. |
| 5,689,370 | A | 11/1997 | Tonar et al. |
| 5,691,848 | A | 11/1997 | Van Lente et al. |
| 5,692,819 | A | 12/1997 | Mitsutake et al. |
| 5,696,529 | A | 12/1997 | Evanicky et al. |
| 5,696,567 | A | 12/1997 | Wada et al. |

| | | | | | |
|---|---|---|---|---|---|
| 5,699,044 A | 12/1997 | Van Lente et al. | 5,877,707 A | 3/1999 | Kowalick |
| 5,699,188 A | 12/1997 | Gilbert et al. | 5,877,897 A | 3/1999 | Schofield et al. |
| 5,703,568 A | 12/1997 | Hegyi | 5,878,353 A | 3/1999 | ul Azam et al. |
| 5,708,410 A | 1/1998 | Blank et al. | 5,878,370 A | 3/1999 | Olson |
| 5,708,415 A | 1/1998 | Van Lente et al. | 5,879,074 A | 3/1999 | Pastrick |
| 5,708,857 A | 1/1998 | Ishibashi | 5,883,605 A | 3/1999 | Knapp |
| 5,715,093 A | 2/1998 | Schierbeek et al. | 5,883,739 A | 3/1999 | Ashihara et al. |
| 5,724,187 A | 3/1998 | Varaprasad et al. | 5,888,431 A | 3/1999 | Tonar et al. |
| 5,724,316 A | 3/1998 | Brunts | 5,894,196 A | 4/1999 | McDermott |
| 5,729,194 A | 3/1998 | Spears et al. | D409,540 S | 5/1999 | Muth |
| 5,737,226 A | 4/1998 | Olson et al. | 5,899,551 A | 5/1999 | Neijzen et al. |
| 5,741,966 A | 4/1998 | Handfield et al. | 5,899,956 A | 5/1999 | Chan |
| 5,744,227 A | 4/1998 | Bright et al. | 5,904,729 A | 5/1999 | Ruzicka |
| 5,745,050 A | 4/1998 | Nakagawa | 5,910,854 A | 6/1999 | Varaprasad et al. |
| 5,745,266 A | 4/1998 | Smith | 5,914,815 A | 6/1999 | Bos |
| 5,748,172 A | 5/1998 | Song et al. | 5,917,664 A | 6/1999 | O'Neill et al. |
| 5,748,287 A | 5/1998 | Takahashi et al. | 5,918,180 A | 6/1999 | Dimino |
| 5,751,211 A | 5/1998 | Shirai et al. | 5,922,176 A | 7/1999 | Caskey |
| 5,751,246 A | 5/1998 | Hertel | 5,923,027 A | 7/1999 | Stam et al. |
| 5,751,390 A | 5/1998 | Crawford et al. | 5,923,457 A | 7/1999 | Byker et al. |
| 5,751,489 A | 5/1998 | Caskey et al. | 5,924,212 A | 7/1999 | Domanski |
| 5,754,099 A | 5/1998 | Nishimura et al. | 5,926,087 A | 7/1999 | Busch et al. |
| D394,833 S | 6/1998 | Muth | 5,927,792 A | 7/1999 | Welling et al. |
| 5,760,828 A | 6/1998 | Cortes | 5,928,572 A | 7/1999 | Tonar et al. |
| 5,760,931 A | 6/1998 | Saburi et al. | 5,929,786 A | 7/1999 | Schofield et al. |
| 5,760,962 A | 6/1998 | Schofield et al. | 5,935,702 A | 8/1999 | Macquart et al. |
| 5,761,094 A | 6/1998 | Olson et al. | 5,938,320 A | 8/1999 | Crandall |
| 5,762,823 A | 6/1998 | Hikmet | 5,938,321 A | 8/1999 | Bos et al. |
| 5,764,139 A | 6/1998 | Nojima et al. | 5,938,721 A | 8/1999 | Dussell et al. |
| 5,765,940 A | 6/1998 | Levy et al. | 5,940,011 A | 8/1999 | Agravante et al. |
| 5,767,793 A | 6/1998 | Agravante et al. | 5,940,120 A | 8/1999 | Frankhouse et al. |
| 5,768,020 A | 6/1998 | Nagao | 5,940,201 A | 8/1999 | Ash et al. |
| 5,775,762 A | 7/1998 | Vitito | 5,942,895 A | 8/1999 | Popovic et al. |
| 5,777,779 A | 7/1998 | Hashimoto et al. | 5,947,586 A | 9/1999 | Weber |
| 5,780,160 A | 7/1998 | Allemand et al. | 5,949,331 A | 9/1999 | Schofield et al. |
| 5,786,772 A | 7/1998 | Schofield et al. | 5,956,079 A | 9/1999 | Ridgley |
| 5,788,357 A | 8/1998 | Muth et al. | 5,956,181 A | 9/1999 | Lin |
| 5,790,298 A | 8/1998 | Tonar | 5,959,367 A | 9/1999 | O'Farrell et al. |
| 5,790,502 A | 8/1998 | Horinouchi et al. | 5,959,555 A | 9/1999 | Furuta |
| 5,790,973 A | 8/1998 | Blaker et al. | 5,959,577 A | 9/1999 | Fan et al. |
| 5,793,308 A | 8/1998 | Rosinski et al. | 5,963,247 A | 10/1999 | Banitt |
| 5,793,420 A | 8/1998 | Schmidt | 5,965,247 A | 10/1999 | Jonza et al. |
| 5,796,094 A | 8/1998 | Schofield et al. | 5,968,538 A | 10/1999 | Snyder, Jr. |
| 5,796,176 A | 8/1998 | Kramer et al. | 5,971,552 A | 10/1999 | O'Farrell et al. |
| 5,798,057 A | 8/1998 | Hikmet | 5,973,760 A | 10/1999 | Dehmlow |
| 5,798,575 A | 8/1998 | O'Farrell et al. | 5,975,715 A | 11/1999 | Bauder |
| 5,798,688 A | 8/1998 | Schofield | 5,984,482 A | 11/1999 | Rumsey et al. |
| 5,800,918 A | 9/1998 | Chartier et al. | 5,986,730 A | 11/1999 | Hansen et al. |
| 5,802,727 A | 9/1998 | Blank et al. | 5,990,469 A | 11/1999 | Bechtel et al. |
| 5,803,579 A | 9/1998 | Turnbull et al. | 5,990,625 A | 11/1999 | Meissner et al. |
| 5,805,330 A | 9/1998 | Byker et al. | 5,995,180 A | 11/1999 | Moriwaki et al. |
| 5,805,367 A | 9/1998 | Kanazawa | 5,998,617 A | 12/1999 | Srinivasa et al. |
| 5,806,879 A | 9/1998 | Hamada et al. | 5,998,929 A | 12/1999 | Bechtel et al. |
| 5,806,965 A | 9/1998 | Deese | 6,000,823 A | 12/1999 | Desmond et al. |
| 5,808,197 A | 9/1998 | Dao | 6,001,486 A | 12/1999 | Varaprasad et al. |
| 5,808,566 A | 9/1998 | Behr et al. | 6,002,511 A | 12/1999 | Varaprasad et al. |
| 5,808,589 A | 9/1998 | Fergason | 6,002,544 A | 12/1999 | Yatsu |
| 5,808,713 A | 9/1998 | Broer et al. | 6,002,983 A | 12/1999 | Alland et al. |
| 5,808,777 A | 9/1998 | Lynam et al. | 6,005,724 A | 12/1999 | Todd |
| 5,808,778 A | 9/1998 | Bauer et al. | 6,007,222 A | 12/1999 | Thau |
| 5,812,321 A | 9/1998 | Schierbeek et al. | 6,008,486 A | 12/1999 | Stam et al. |
| 5,813,745 A | 9/1998 | Fant, Jr. et al. | 6,008,871 A | 12/1999 | Okumura |
| 5,818,625 A | 10/1998 | Forgette et al. | 6,009,359 A | 12/1999 | El-Hakim et al. |
| 5,820,097 A | 10/1998 | Spooner | 6,016,035 A | 1/2000 | Eberspächer et al. |
| 5,820,245 A | 10/1998 | Desmond et al. | 6,016,215 A | 1/2000 | Byker |
| 5,822,023 A | 10/1998 | Suman et al. | 6,019,411 A | 2/2000 | Carter et al. |
| 5,823,654 A | 10/1998 | Pastrick et al. | 6,019,475 A | 2/2000 | Lynam et al. |
| 5,825,527 A | 10/1998 | Forgette et al. | 6,020,987 A | 2/2000 | Baumann et al. |
| 5,835,166 A | 11/1998 | Hall et al. | 6,021,371 A | 2/2000 | Fultz |
| 5,837,994 A | 11/1998 | Stam et al. | 6,023,229 A | 2/2000 | Bugno et al. |
| 5,844,505 A | 12/1998 | Van Ryzin | 6,025,872 A | 2/2000 | Ozaki et al. |
| 5,848,373 A | 12/1998 | DeLorme et al. | 6,028,537 A | 2/2000 | Suman et al. |
| 5,850,176 A | 12/1998 | Kinoshita et al. | 6,037,689 A | 3/2000 | Bingle et al. |
| 5,850,205 A | 12/1998 | Blouin | 6,040,939 A | 3/2000 | Demiryont et al. |
| 5,863,116 A | 1/1999 | Pastrick et al. | 6,042,253 A | 3/2000 | Fant, Jr. et al. |
| 5,864,419 A | 1/1999 | Lynam | 6,042,934 A | 3/2000 | Guiselin et al. |
| 5,867,801 A | 2/1999 | Denny | 6,045,243 A | 4/2000 | Muth et al. |
| 5,871,275 A | 2/1999 | O'Farrell et al. | 6,045,643 A | 4/2000 | Byker et al. |
| 5,871,843 A | 2/1999 | Yoneda et al. | 6,046,766 A | 4/2000 | Sakata |

| | | | | | | |
|---|---|---|---|---|---|---|
| 6,046,837 | A | 4/2000 | Yamamoto | 6,157,418 A | 12/2000 | Rosen |
| 6,049,171 | A | 4/2000 | Stam et al. | 6,157,480 A | 12/2000 | Anderson et al. |
| D425,466 | S | 5/2000 | Todd et al. | 6,158,655 A | 12/2000 | DeVries, Jr. et al. |
| 6,060,989 | A | 5/2000 | Gehlot | 6,161,865 A | 12/2000 | Rose et al. |
| 6,061,002 | A | 5/2000 | Weber et al. | 6,164,564 A | 12/2000 | Franco et al. |
| 6,062,920 | A | 5/2000 | Jordan et al. | 6,166,625 A | 12/2000 | Teowee et al. |
| 6,064,508 | A | 5/2000 | Forgette et al. | 6,166,629 A | 12/2000 | Hamma et al. |
| 6,065,840 | A | 5/2000 | Caskey et al. | 6,166,834 A | 12/2000 | Taketomi et al. |
| 6,066,920 | A | 5/2000 | Torihara et al. | 6,166,847 A | 12/2000 | Tench et al. |
| 6,067,111 | A | 5/2000 | Hahn et al. | 6,166,848 A | 12/2000 | Cammenga et al. |
| 6,067,500 | A | 5/2000 | Morimoto et al. | 6,167,255 A | 12/2000 | Kennedy, III et al. |
| 6,068,380 | A | 5/2000 | Lynn et al. | 6,167,755 B1 | 1/2001 | Damson et al. |
| D426,506 | S | 6/2000 | Todd et al. | 6,169,955 B1 | 1/2001 | Fultz |
| D426,507 | S | 6/2000 | Todd et al. | 6,170,956 B1 | 1/2001 | Rumsey et al. |
| D427,128 | S | 6/2000 | Mathieu | 6,172,600 B1 | 1/2001 | Kakinama et al. |
| 6,072,391 | A | 6/2000 | Suzukie et al. | 6,172,601 B1 | 1/2001 | Wada et al. |
| 6,074,077 | A | 6/2000 | Pastrick et al. | 6,172,613 B1 | 1/2001 | DeLine et al. |
| 6,074,777 | A | 6/2000 | Reimers et al. | 6,173,501 B1 | 1/2001 | Blank et al. |
| 6,076,948 | A | 6/2000 | Bukosky et al. | 6,175,164 B1 | 1/2001 | O'Farrell et al. |
| 6,078,355 | A | 6/2000 | Zengel | 6,175,300 B1 | 1/2001 | Kendrick |
| 6,078,865 | A | 6/2000 | Koyanagi | 6,176,602 B1 | 1/2001 | Pastrick et al. |
| D428,372 | S | 7/2000 | Todd et al. | 6,178,034 B1 | 1/2001 | Allemand et al. |
| D428,373 | S | 7/2000 | Todd et al. | 6,178,377 B1 | 1/2001 | Ishihara et al. |
| 6,082,881 | A | 7/2000 | Hicks | 6,181,387 B1 | 1/2001 | Rosen |
| 6,084,700 | A | 7/2000 | Knapp et al. | 6,182,006 B1 | 1/2001 | Meek |
| 6,086,131 | A | 7/2000 | Bingle et al. | 6,183,119 B1 | 2/2001 | Desmond et al. |
| 6,086,229 | A | 7/2000 | Pastrick | 6,184,679 B1 | 2/2001 | Popovic et al. |
| 6,087,012 | A | 7/2000 | Varaprasad et al. | 6,184,781 B1 | 2/2001 | Ramakesavan |
| 6,087,953 | A | 7/2000 | DeLine et al. | 6,185,492 B1 | 2/2001 | Kagawa et al. |
| 6,091,343 | A | 7/2000 | Dykema et al. | 6,185,501 B1 | 2/2001 | Smith et al. |
| 6,093,976 | A | 7/2000 | Kramer et al. | 6,188,505 B1 | 2/2001 | Lomprey et al. |
| 6,094,618 | A | 7/2000 | Harada | 6,191,704 B1 | 2/2001 | Takenaga et al. |
| D428,842 | S | 8/2000 | Todd et al. | 6,193,912 B1 | 2/2001 | Thieste et al. |
| D429,202 | S | 8/2000 | Todd et al. | 6,195,194 B1 | 2/2001 | Roberts et al. |
| D430,088 | S | 8/2000 | Todd et al. | 6,196,688 B1 | 3/2001 | Caskey et al. |
| 6,097,023 | A | 8/2000 | Schofield et al. | 6,198,409 B1 | 3/2001 | Schofield et al. |
| 6,097,316 | A | 8/2000 | Liaw et al. | 6,199,014 B1 | 3/2001 | Walker et al. |
| 6,099,131 | A | 8/2000 | Fletcher et al. | 6,199,810 B1 | 3/2001 | Wu et al. |
| 6,099,155 | A | 8/2000 | Pastrick et al. | 6,200,010 B1 | 3/2001 | Anders |
| 6,102,546 | A | 8/2000 | Carter | 6,201,642 B1 | 3/2001 | Bos |
| 6,102,559 | A | 8/2000 | Nold et al. | 6,206,553 B1 | 3/2001 | Boddy et al. |
| 6,104,552 | A | 8/2000 | Thau et al. | 6,207,083 B1 | 3/2001 | Varaprasad et al. |
| 6,106,121 | A | 8/2000 | Buckley et al. | 6,210,008 B1 | 4/2001 | Hoekstra et al. |
| 6,111,498 | A | 8/2000 | Jobes, I et al. | 6,210,012 B1 | 4/2001 | Broer |
| 6,111,683 | A | 8/2000 | Cammenga et al. | 6,212,470 B1 | 4/2001 | Seymour et al. |
| 6,111,684 | A | 8/2000 | Forgette et al. | 6,217,181 B1 | 4/2001 | Lynam et al. |
| 6,111,685 | A | 8/2000 | Tench et al. | 6,218,934 B1 | 4/2001 | Regan |
| 6,111,696 | A | 8/2000 | Allen et al. | 6,222,447 B1 | 4/2001 | Schofield et al. |
| 6,115,086 | A | 9/2000 | Rosen | 6,222,460 B1 | 4/2001 | DeLine et al. |
| 6,115,651 | A | 9/2000 | Cruz | 6,222,689 B1 | 4/2001 | Higuchi et al. |
| 6,116,743 | A | 9/2000 | Hoek | 6,227,689 B1 | 5/2001 | Miller |
| 6,118,219 | A | 9/2000 | Okigami et al. | 6,232,937 B1 | 5/2001 | Jacobsen et al. |
| 6,122,597 | A | 9/2000 | Saneyoshi et al. | 6,236,514 B1 | 5/2001 | Sato |
| 6,122,921 | A | 9/2000 | Brezoczky et al. | 6,239,851 B1 | 5/2001 | Hatazawa et al. |
| 6,124,647 | A | 9/2000 | Marcus et al. | 6,239,898 B1 | 5/2001 | Byker et al. |
| 6,124,886 | A | 9/2000 | DeLine et al. | 6,239,899 B1 | 5/2001 | DeVries et al. |
| 6,127,919 | A | 10/2000 | Wylin | 6,243,003 B1 | 6/2001 | DeLine et al. |
| 6,127,945 | A | 10/2000 | Mura-Smith | 6,244,716 B1 | 6/2001 | Steenwyk et al. |
| 6,128,576 | A | 10/2000 | Nishimoto et al. | 6,245,262 B1 | 6/2001 | Varaprasad et al. |
| 6,130,421 | A | 10/2000 | Bechtel et al. | 6,247,820 B1 | 6/2001 | Van Order |
| 6,130,448 | A | 10/2000 | Bauer et al. | 6,249,214 B1 | 6/2001 | Kashiwazaki |
| 6,132,072 | A | 10/2000 | Turnbull et al. | 6,249,310 B1 | 6/2001 | Lefkowitz |
| 6,137,620 | A | 10/2000 | Guarr et al. | 6,249,369 B1 | 6/2001 | Theiste et al. |
| 6,139,171 | A | 10/2000 | Waldmann | 6,250,148 B1 | 6/2001 | Lynam |
| 6,139,172 | A | 10/2000 | Bos et al. | 6,250,766 B1 | 6/2001 | Strumolo et al. |
| 6,140,933 | A | 10/2000 | Bugno et al. | 6,250,783 B1 | 6/2001 | Stidham et al. |
| 6,142,656 | A | 11/2000 | Kurth | 6,255,639 B1 | 7/2001 | Stam et al. |
| 6,146,003 | A | 11/2000 | Thau | 6,257,746 B1 | 7/2001 | Todd et al. |
| 6,147,934 | A | 11/2000 | Arikawa et al. | 6,259,412 B1 | 7/2001 | Duroux |
| 6,148,261 | A | 11/2000 | Obradovich et al. | 6,259,475 B1 | 7/2001 | Ramachandran et al. |
| 6,149,287 | A | 11/2000 | Pastrick et al. | 6,260,608 B1 | 7/2001 | Kim |
| 6,150,014 | A | 11/2000 | Chu et al. | 6,262,842 B1 | 7/2001 | Ouderkirk et al. |
| 6,151,065 | A | 11/2000 | Steed et al. | 6,264,353 B1 | 7/2001 | Caraher et al. |
| 6,151,539 | A | 11/2000 | Bergholz et al. | 6,265,968 B1 | 7/2001 | Betzitza et al. |
| 6,152,551 | A | 11/2000 | Annas | 6,268,803 B1 | 7/2001 | Gunderson et al. |
| 6,152,590 | A | 11/2000 | Fürst et al. | 6,268,837 B1 | 7/2001 | Kobayashi et al. |
| 6,154,149 | A | 11/2000 | Tyckowski et al. | 6,269,308 B1 | 7/2001 | Kodaka et al. |
| 6,154,306 | A | 11/2000 | Varaprasad et al. | 6,271,901 B1 | 8/2001 | Ide et al. |
| 6,157,294 | A | 12/2000 | Urai et al. | 6,274,221 B2 | 8/2001 | Smith et al. |

| Patent | Type | Date | Inventor |
|---|---|---|---|
| 6,276,821 | B1 | 8/2001 | Pastrick et al. |
| 6,276,822 | B1 | 8/2001 | Bedrosian et al. |
| 6,277,471 | B1 | 8/2001 | Tang |
| 6,278,271 | B1 | 8/2001 | Schott |
| 6,278,377 | B1 | 8/2001 | DeLine et al. |
| 6,278,941 | B1 | 8/2001 | Yokoyama |
| 6,280,068 | B1 | 8/2001 | Mertens et al. |
| 6,280,069 | B1 | 8/2001 | Pastrick et al. |
| 6,281,804 | B1 | 8/2001 | Haller et al. |
| 6,286,965 | B1 | 9/2001 | Caskey et al. |
| 6,286,984 | B1 | 9/2001 | Berg |
| 6,289,332 | B2 | 9/2001 | Menig et al. |
| 6,290,378 | B1 | 9/2001 | Buchalla et al. |
| 6,291,905 | B1 | 9/2001 | Drummond et al. |
| 6,291,906 | B1 | 9/2001 | Marcus et al. |
| 6,294,989 | B1 | 9/2001 | Schofield et al. |
| 6,296,379 | B1 | 10/2001 | Pastrick |
| 6,297,781 | B1 | 10/2001 | Turnbull et al. |
| 6,299,333 | B1 | 10/2001 | Pastrick et al. |
| 6,300,879 | B1 | 10/2001 | Regan et al. |
| 6,301,039 | B1 | 10/2001 | Tench |
| 6,304,173 | B2 | 10/2001 | Pala et al. |
| 6,305,807 | B1 | 10/2001 | Schierbeek |
| 6,310,611 | B1 | 10/2001 | Caldwell |
| 6,310,714 | B1 | 10/2001 | Lomprey et al. |
| 6,310,738 | B1 | 10/2001 | Chu |
| 6,313,454 | B1 | 11/2001 | Bos et al. |
| 6,314,295 | B1 | 11/2001 | Kawamoto |
| 6,315,440 | B1 | 11/2001 | Satoh |
| 6,317,057 | B1 | 11/2001 | Lee |
| 6,317,180 | B1 | 11/2001 | Kuroiwa et al. |
| 6,317,248 | B1 | 11/2001 | Agrawal et al. |
| 6,318,870 | B1 | 11/2001 | Spooner et al. |
| 6,320,176 | B1 | 11/2001 | Schofield et al. |
| 6,320,282 | B1 | 11/2001 | Caldwell |
| 6,320,612 | B1 | 11/2001 | Young |
| 6,324,295 | B1 | 11/2001 | Valery et al. |
| 6,326,613 | B1 | 12/2001 | Heslin et al. |
| 6,326,900 | B2 | 12/2001 | DeLine et al. |
| 6,329,925 | B1 | 12/2001 | Skiver et al. |
| 6,330,511 | B2 | 12/2001 | Ogura et al. |
| 6,331,066 | B1 | 12/2001 | Desmond et al. |
| 6,333,759 | B1 | 12/2001 | Mazzilli |
| 6,335,680 | B1 | 1/2002 | Matsuoka |
| 6,336,737 | B1 | 1/2002 | Thau |
| 6,340,850 | B2 | 1/2002 | O'Farrell et al. |
| 6,341,523 | B2 | 1/2002 | Lynam |
| 6,344,805 | B1 | 2/2002 | Yasui et al. |
| 6,346,698 | B1 | 2/2002 | Turnbull |
| 6,347,880 | B1 | 2/2002 | Fürst et al. |
| 6,348,858 | B2 | 2/2002 | Weis et al. |
| 6,351,708 | B1 | 2/2002 | Takagi et al. |
| 6,353,392 | B1 | 3/2002 | Schofield et al. |
| 6,356,206 | B1 | 3/2002 | Takenaga et al. |
| 6,356,376 | B1 | 3/2002 | Tonar et al. |
| 6,356,389 | B1 | 3/2002 | Nilsen et al. |
| 6,357,883 | B1 | 3/2002 | Strumolo et al. |
| 6,362,121 | B1 | 3/2002 | Chopin et al. |
| 6,362,548 | B1 | 3/2002 | Bingle et al. |
| 6,363,326 | B1 | 3/2002 | Scully |
| 6,366,013 | B1 | 4/2002 | Leenders et al. |
| 6,366,213 | B2 | 4/2002 | DeLine et al. |
| 6,370,329 | B1 | 4/2002 | Teuchert |
| 6,371,636 | B1 | 4/2002 | Wesson |
| 6,379,013 | B1 | 4/2002 | Bechtel et al. |
| 6,379,788 | B2 | 4/2002 | Choi et al. |
| 6,382,805 | B1 | 5/2002 | Miyabukuro |
| 6,385,139 | B1 | 5/2002 | Arikawa et al. |
| 6,386,742 | B1 | 5/2002 | DeLine et al. |
| 6,390,529 | B1 | 5/2002 | Bingle et al. |
| 6,390,626 | B2 | 5/2002 | Knox |
| 6,390,635 | B2 | 5/2002 | Whitehead et al. |
| 6,396,397 | B1 | 5/2002 | Bos et al. |
| 6,396,408 | B2 | 5/2002 | Drummond et al. |
| 6,396,637 | B2 | 5/2002 | Roest et al. |
| 6,407,468 | B1 | 6/2002 | LeVesque et al. |
| 6,407,847 | B1 | 6/2002 | Poll et al. |
| 6,408,247 | B1 | 6/2002 | Ichikawa et al. |
| 6,411,204 | B1 | 6/2002 | Bloomfield et al. |
| 6,412,959 | B1 | 7/2002 | Tseng |
| 6,412,973 | B1 | 7/2002 | Bos et al. |
| 6,414,910 | B1 | 7/2002 | Kaneko et al. |
| 6,415,230 | B1 | 7/2002 | Maruko et al. |
| 6,416,208 | B2 | 7/2002 | Pastrick et al. |
| 6,417,786 | B2 | 7/2002 | Learman et al. |
| 6,418,376 | B1 | 7/2002 | Olson |
| 6,419,300 | B1 | 7/2002 | Pavao et al. |
| 6,420,036 | B1 | 7/2002 | Varaprasad et al. |
| 6,420,800 | B1 | 7/2002 | LeVesque et al. |
| 6,420,975 | B1 | 7/2002 | DeLine et al. |
| 6,421,081 | B1 | 7/2002 | Markus |
| 6,424,272 | B1 | 7/2002 | Gutta et al. |
| 6,424,273 | B1 | 7/2002 | Gutta et al. |
| 6,424,892 | B1 | 7/2002 | Matsuoka |
| 6,426,492 | B1 | 7/2002 | Bos et al. |
| 6,426,568 | B2 | 7/2002 | Turnbull et al. |
| 6,427,349 | B1 | 8/2002 | Blank et al. |
| 6,428,172 | B1 | 8/2002 | Hutzel et al. |
| 6,433,676 | B2 | 8/2002 | DeLine et al. |
| 6,433,680 | B1 | 8/2002 | Ho |
| 6,433,914 | B1 | 8/2002 | Lomprey et al. |
| 6,437,688 | B1 | 8/2002 | Kobayashi |
| 6,438,491 | B1 | 8/2002 | Farmer |
| 6,439,755 | B1 | 8/2002 | Fant, Jr. et al. |
| 6,441,872 | B1 | 8/2002 | Ho |
| 6,441,943 | B1 | 8/2002 | Roberts et al. |
| 6,441,963 | B2 | 8/2002 | Murakami et al. |
| 6,441,964 | B1 | 8/2002 | Chu et al. |
| 6,445,287 | B1 | 9/2002 | Schofield et al. |
| 6,447,128 | B1 | 9/2002 | Lang et al. |
| 6,449,082 | B1 | 9/2002 | Agrawal et al. |
| 6,452,533 | B1 | 9/2002 | Yamabuchi et al. |
| 6,462,795 | B1 | 10/2002 | Clarke |
| 6,463,369 | B2 | 10/2002 | Sadano et al. |
| 6,466,701 | B1 | 10/2002 | Ejiri et al. |
| 6,471,362 | B1 | 10/2002 | Carter et al. |
| 6,472,977 | B1 | 10/2002 | Pöchmüller |
| 6,472,979 | B2 | 10/2002 | Schofield et al. |
| 6,473,001 | B1 | 10/2002 | Blum |
| 6,474,853 | B2 | 11/2002 | Pastrick et al. |
| 6,476,731 | B1 | 11/2002 | Miki et al. |
| 6,477,460 | B2 | 11/2002 | Kepler |
| 6,477,464 | B2 | 11/2002 | McCarthy et al. |
| 6,483,429 | B1 | 11/2002 | Yasui et al. |
| 6,483,438 | B2 | 11/2002 | DeLine et al. |
| 6,483,613 | B1 | 11/2002 | Woodgate et al. |
| 6,487,500 | B2 | 11/2002 | Lemelson et al. |
| 6,494,602 | B2 | 12/2002 | Pastrick et al. |
| 6,498,620 | B2 | 12/2002 | Schofield et al. |
| 6,501,387 | B2 | 12/2002 | Skiver et al. |
| 6,512,203 | B2 | 1/2003 | Jones et al. |
| 6,512,624 | B2 | 1/2003 | Tonar et al. |
| 6,513,252 | B1 | 2/2003 | Schierbeek et al. |
| 6,515,378 | B2 | 2/2003 | Drummond et al. |
| 6,515,581 | B1 | 2/2003 | Ho |
| 6,515,582 | B1 | 2/2003 | Teowee |
| 6,515,597 | B1 | 2/2003 | Wada et al. |
| 6,516,664 | B2 | 2/2003 | Lynam |
| 6,518,691 | B1 | 2/2003 | Baba |
| 6,519,209 | B1 | 2/2003 | Arikawa et al. |
| 6,520,667 | B1 | 2/2003 | Mousseau |
| 6,522,451 | B1 | 2/2003 | Lynam |
| 6,522,969 | B2 | 2/2003 | Kannonji |
| 6,525,707 | B1 | 2/2003 | Kaneko et al. |
| 6,534,884 | B2 | 3/2003 | Marcus et al. |
| 6,538,709 | B1 | 3/2003 | Kurihara et al. |
| 6,539,306 | B2 | 3/2003 | Turnbull et al. |
| 6,542,085 | B1 | 4/2003 | Yang |
| 6,542,182 | B1 | 4/2003 | Chautorash |
| 6,543,163 | B1 | 4/2003 | Ginsberg |
| 6,545,598 | B1 | 4/2003 | de Villeroche |
| 6,549,253 | B1 | 4/2003 | Robbie et al. |
| 6,549,335 | B1 | 4/2003 | Trapani et al. |
| 6,550,949 | B1 | 4/2003 | Bauer et al. |
| 6,552,326 | B2 | 4/2003 | Turnbull |
| 6,552,653 | B2 | 4/2003 | Nakaho et al. |
| 6,553,308 | B1 | 4/2003 | Uhlmann et al. |
| 6,559,902 | B1 | 5/2003 | Kusuda et al. |

| | | | | | | |
|---|---|---|---|---|---|---|
| 6,560,004 B2 | 5/2003 | Theiste et al. | 6,693,517 B2 | 2/2004 | McCarthy et al. |
| 6,560,027 B2 | 5/2003 | Meine | 6,693,518 B2 | 2/2004 | Kumata et al. |
| 6,566,821 B2 | 5/2003 | Nakatsuka et al. | 6,693,519 B2 | 2/2004 | Keirstead |
| 6,567,060 B1 | 5/2003 | Sekiguchi | 6,693,524 B1 | 2/2004 | Payne |
| 6,567,708 B1 | 5/2003 | Bechtel et al. | 6,700,692 B2 | 3/2004 | Tonar et al. |
| 6,568,839 B1 | 5/2003 | Pastrick et al. | 6,709,136 B2 | 3/2004 | Pastrick et al. |
| 6,572,233 B1 | 6/2003 | Northman et al. | 6,713,783 B2 | 3/2004 | Mase et al. |
| 6,573,957 B1 | 6/2003 | Suzuki | 6,717,109 B1 | 4/2004 | Macher et al. |
| 6,573,963 B2 | 6/2003 | Ouderkirk et al. | 6,717,610 B1 | 4/2004 | Bos et al. |
| 6,575,582 B2 | 6/2003 | Tenmyo | 6,717,712 B2 | 4/2004 | Lynam et al. |
| 6,575,643 B2 | 6/2003 | Takashashi | 6,719,215 B2 | 4/2004 | Droulliard |
| 6,578,989 B2 | 6/2003 | Osumi et al. | 6,724,446 B2 | 4/2004 | Motomura et al. |
| 6,580,373 B1 | 6/2003 | Ohashi | 6,726,337 B2 | 4/2004 | Whitehead et al. |
| 6,580,479 B1 | 6/2003 | Sekiguchi et al. | 6,727,807 B2 | 4/2004 | Trajkovic et al. |
| 6,580,562 B2 | 6/2003 | Aoki et al. | 6,727,808 B1 | 4/2004 | Uselmann et al. |
| 6,581,007 B2 | 6/2003 | Hasegawa et al. | 6,727,844 B2 | 4/2004 | Zimmermann et al. |
| 6,583,730 B2 | 6/2003 | Lang et al. | 6,731,332 B1 | 5/2004 | Yasui et al. |
| 6,591,192 B2 | 7/2003 | Okamura et al. | 6,734,807 B2 | 5/2004 | King |
| 6,592,230 B2 | 7/2003 | Dupay | 6,736,526 B2 | 5/2004 | Matsuba et al. |
| 6,593,565 B2 | 7/2003 | Heslin et al. | 6,737,629 B2 | 5/2004 | Nixon et al. |
| 6,593,984 B2 | 7/2003 | Arakawa et al. | 6,737,630 B2 | 5/2004 | Turnbull |
| 6,594,065 B2 | 7/2003 | Byker et al. | 6,737,964 B2 | 5/2004 | Samman et al. |
| 6,594,067 B2 | 7/2003 | Poll et al. | 6,738,088 B1 | 5/2004 | Uskolovsky et al. |
| 6,594,090 B2 | 7/2003 | Kruschwitz et al. | 6,742,904 B2 | 6/2004 | Bechtel et al. |
| 6,594,583 B2 | 7/2003 | Ogura et al. | 6,744,353 B2 | 6/2004 | Sjönell |
| 6,594,614 B2 | 7/2003 | Studt et al. | 6,746,775 B1 | 6/2004 | Boire et al. |
| 6,595,649 B2 | 7/2003 | Hoekstra et al. | 6,747,716 B2 | 6/2004 | Kuroiwa et al. |
| 6,597,489 B1 | 7/2003 | Guarr et al. | 6,748,211 B1 | 6/2004 | Isaac et al. |
| 6,606,183 B2 | 8/2003 | Ikai et al. | 6,749,308 B1 | 6/2004 | Niendorf et al. |
| 6,611,202 B2 | 8/2003 | Schofield et al. | 6,755,542 B2 | 6/2004 | Bechtel et al. |
| 6,611,227 B1 | 8/2003 | Nebiyeloul-Kifle et al. | 6,756,912 B2 | 6/2004 | Skiver et al. |
| 6,611,759 B2 | 8/2003 | Brosche | 6,757,039 B2 | 6/2004 | Ma |
| 6,612,723 B2 | 9/2003 | Futhey et al. | 6,757,109 B2 | 6/2004 | Bos |
| 6,614,387 B1 | 9/2003 | Deadman | D493,131 S | 7/2004 | Lawlor et al. |
| 6,614,579 B2 | 9/2003 | Roberts et al. | D493,394 S | 7/2004 | Lawlor et al. |
| 6,615,438 B1 | 9/2003 | Franco et al. | 6,759,113 B1 | 7/2004 | Tang |
| 6,616,313 B2 | 9/2003 | Fürst et al. | 6,759,945 B2 | 7/2004 | Richard |
| 6,616,764 B2 | 9/2003 | Krämer et al. | 6,760,157 B1 | 7/2004 | Allen et al. |
| 6,618,672 B2 | 9/2003 | Sasaki et al. | 6,765,480 B2 | 7/2004 | Tseng |
| 6,621,616 B1 | 9/2003 | Bauer et al. | 6,773,116 B2 | 8/2004 | De Vaan et al. |
| 6,624,936 B2 | 9/2003 | Kotchick et al. | 6,774,356 B2 | 8/2004 | Heslin et al. |
| 6,627,918 B2 | 9/2003 | Getz et al. | 6,774,810 B2 | 8/2004 | DeLine et al. |
| 6,630,888 B2 | 10/2003 | Lang et al. | 6,778,904 B2 | 8/2004 | Iwami et al. |
| 6,636,190 B2 | 10/2003 | Hirakata et al. | 6,779,900 B2 | 8/2004 | Nolan-Brown |
| 6,636,258 B2 | 10/2003 | Strumolo | 6,781,738 B2 | 8/2004 | Kikuchi et al. |
| 6,638,582 B1 | 10/2003 | Uchiyama et al. | 6,782,718 B2 | 8/2004 | Lingle et al. |
| 6,639,360 B2 | 10/2003 | Roberts et al. | 6,784,129 B2 | 8/2004 | Seto et al. |
| 6,642,840 B2 | 11/2003 | Lang et al. | 6,797,396 B1 | 9/2004 | Liu et al. |
| 6,642,851 B2 | 11/2003 | DeLine et al. | 6,800,871 B2 | 10/2004 | Matsuda et al. |
| 6,646,697 B1 | 11/2003 | Sekiguchi et al. | 6,801,127 B2 | 10/2004 | Mizusawa et al. |
| 6,648,477 B2 | 11/2003 | Hutzel et al. | 6,801,244 B2 | 10/2004 | Takeda et al. |
| 6,650,457 B2 | 11/2003 | Busscher et al. | 6,801,283 B2 | 10/2004 | Koyama et al. |
| 6,657,607 B1 | 12/2003 | Evanicky et al. | 6,805,474 B2 | 10/2004 | Walser et al. |
| 6,661,482 B2 | 12/2003 | Hara | 6,806,452 B2 | 10/2004 | Bos et al. |
| 6,661,830 B1 | 12/2003 | Reed et al. | 6,806,922 B2 | 10/2004 | Ishitaka |
| 6,663,262 B2 | 12/2003 | Boyd et al. | 6,810,323 B1 | 10/2004 | Bullock et al. |
| 6,665,592 B2 | 12/2003 | Kodama | 6,812,463 B2 | 11/2004 | Okada |
| 6,669,109 B2 | 12/2003 | Ivanov et al. | 6,812,907 B1 | 11/2004 | Gennetten et al. |
| 6,669,285 B1 | 12/2003 | Park et al. | 6,819,231 B2 | 11/2004 | Berberich et al. |
| 6,670,207 B1 | 12/2003 | Roberts | 6,823,261 B2 | 11/2004 | Sekiguchi |
| 6,670,910 B2 | 12/2003 | Delcheccolo et al. | 6,824,281 B2 | 11/2004 | Schofield et al. |
| 6,670,941 B2 | 12/2003 | Albu et al. | 6,831,268 B2 | 12/2004 | Bechtel et al. |
| 6,671,080 B2 | 12/2003 | Poll et al. | 6,832,848 B2 | 12/2004 | Pastrick |
| 6,672,731 B2 | 1/2004 | Schnell et al. | 6,834,969 B2 | 12/2004 | Bade et al. |
| 6,672,734 B2 | 1/2004 | Lammers | 6,836,725 B2 | 12/2004 | Millington et al. |
| 6,672,744 B2 | 1/2004 | DeLine et al. | 6,838,980 B2 | 1/2005 | Gloger et al. |
| 6,672,745 B2 | 1/2004 | Bauer et al. | 6,842,189 B2 | 1/2005 | Park |
| 6,674,370 B2 | 1/2004 | Rodewald et al. | 6,842,276 B2 | 1/2005 | Poll et al. |
| 6,675,075 B1 | 1/2004 | Engelsburg et al. | 6,845,805 B1 | 1/2005 | Köster |
| 6,678,083 B1 | 1/2004 | Anstee | 6,846,098 B2 | 1/2005 | Bourdelais et al. |
| 6,678,614 B2 | 1/2004 | McCarthy et al. | 6,847,424 B2 | 1/2005 | Gotoh et al. |
| 6,679,608 B2 | 1/2004 | Bechtel et al. | 6,847,487 B2 | 1/2005 | Burgner |
| 6,683,539 B2 | 1/2004 | Trajkovic et al. | 6,848,817 B2 | 2/2005 | Bos et al. |
| 6,683,969 B1 | 1/2004 | Nishigaki et al. | 6,849,165 B2 | 2/2005 | Klöppel et al. |
| 6,685,348 B2 | 2/2004 | Pastrick et al. | 6,853,491 B1 | 2/2005 | Ruhle et al. |
| 6,690,262 B1 | 2/2004 | Winnett | 6,859,148 B2 | 2/2005 | Miller et al. |
| 6,690,268 B2 | 2/2004 | Schofield et al. | 6,870,655 B1 | 3/2005 | Northman et al. |
| 6,690,413 B1 | 2/2004 | Moore | 6,870,656 B2 | 3/2005 | Tonar et al. |
| 6,690,438 B2 | 2/2004 | Sekiguchi | 6,871,982 B2 | 3/2005 | Holman et al. |

| | | |
|---|---|---|
| 6,877,888 B2 | 4/2005 | DeLine et al. |
| 6,882,287 B2 | 4/2005 | Schofield |
| 6,889,064 B2 | 5/2005 | Baratono et al. |
| 6,891,563 B2 | 5/2005 | Schofield et al. |
| 6,898,518 B2 | 5/2005 | Padmanabhan |
| 6,902,284 B2 | 6/2005 | Hutzel et al. |
| 6,904,348 B2 | 6/2005 | Drummond et al. |
| 6,906,620 B2 | 6/2005 | Nakai et al. |
| 6,906,632 B2 | 6/2005 | DeLine et al. |
| 6,909,486 B2 | 6/2005 | Wang et al. |
| 6,910,779 B2 | 6/2005 | Abel et al. |
| 6,912,396 B2 | 6/2005 | Sziraki et al. |
| 6,914,521 B2 | 7/2005 | Rothkop |
| 6,916,099 B2 | 7/2005 | Su et al. |
| 6,917,404 B2 | 7/2005 | Baek |
| 6,918,674 B2 | 7/2005 | Drummond et al. |
| 6,922,902 B2 | 8/2005 | Schierbeek et al. |
| 6,928,180 B2 | 8/2005 | Stam et al. |
| 6,928,366 B2 | 8/2005 | Ockerse et al. |
| 6,930,737 B2 | 8/2005 | Weindorf et al. |
| 6,933,837 B2 | 8/2005 | Gunderson et al. |
| 6,934,067 B2 | 8/2005 | Ash et al. |
| 6,940,423 B2 | 9/2005 | Takagi et al. |
| 6,946,978 B2 | 9/2005 | Schofield |
| 6,947,576 B2 | 9/2005 | Stam et al. |
| 6,947,577 B2 | 9/2005 | Stam et al. |
| 6,949,772 B2 | 9/2005 | Shimizu et al. |
| 6,950,035 B2 | 9/2005 | Tanaka et al. |
| 6,951,410 B2 | 10/2005 | Parsons |
| 6,951,681 B2 | 10/2005 | Hartley et al. |
| 6,952,312 B2 | 10/2005 | Weber et al. |
| 6,958,495 B2 | 10/2005 | Nishijima et al. |
| 6,958,683 B2 | 10/2005 | Mills et al. |
| 6,959,994 B2 | 11/2005 | Fujikawa et al. |
| 6,961,178 B2 | 11/2005 | Sugino et al. |
| 6,961,661 B2 | 11/2005 | Sekiguchi |
| 6,963,438 B2 | 11/2005 | Busscher et al. |
| 6,968,273 B2 | 11/2005 | Ockerse et al. |
| 6,971,181 B2 | 12/2005 | Ohm et al. |
| 6,972,888 B2 | 12/2005 | Poll et al. |
| 6,974,236 B2 | 12/2005 | Tenmyo |
| 6,975,215 B2 | 12/2005 | Schofield et al. |
| 6,977,702 B2 | 12/2005 | Wu |
| 6,980,092 B2 | 12/2005 | Turnbull et al. |
| 6,985,291 B2 | 1/2006 | Watson et al. |
| 6,989,736 B2 | 1/2006 | Berberich et al. |
| 6,992,573 B2 | 1/2006 | Blank et al. |
| 6,992,718 B1 | 1/2006 | Takahara |
| 6,992,826 B2 | 1/2006 | Wong |
| 6,995,687 B2 | 2/2006 | Lang et al. |
| 6,997,571 B2 | 2/2006 | Tenmyo |
| 7,001,058 B2 | 2/2006 | Inditsky |
| 7,004,592 B2 | 2/2006 | Varaprasad et al. |
| 7,004,593 B2 | 2/2006 | Weller et al. |
| 7,005,974 B2 | 2/2006 | McMahon et al. |
| 7,006,173 B1 | 2/2006 | Hiyama et al. |
| 7,008,090 B2 | 3/2006 | Blank |
| 7,009,751 B2 | 3/2006 | Tonar et al. |
| 7,012,543 B2 | 3/2006 | DeLine et al. |
| 7,012,727 B2 | 3/2006 | Hutzel et al. |
| 7,023,331 B2 | 4/2006 | Kodama |
| 7,029,156 B2 | 4/2006 | Suehiro et al. |
| 7,030,738 B2 | 4/2006 | Ishii |
| 7,030,775 B2 | 4/2006 | Sekiguchi |
| 7,038,577 B2 | 5/2006 | Pawlicki et al. |
| 7,041,965 B2 | 5/2006 | Heslin et al. |
| 7,042,616 B2 | 5/2006 | Tonar et al. |
| 7,046,418 B2 | 5/2006 | Lin et al. |
| 7,046,448 B2 | 5/2006 | Burgner |
| 7,050,908 B1 | 5/2006 | Schwartz et al. |
| 7,057,505 B2 | 6/2006 | Iwamoto |
| 7,057,681 B2 | 6/2006 | Hinata et al. |
| 7,063,893 B2 | 6/2006 | Hoffman |
| 7,064,882 B2 | 6/2006 | Tonar et al. |
| 7,068,289 B2 | 6/2006 | Satoh et al. |
| 7,074,486 B2 | 7/2006 | Boire et al. |
| 7,081,810 B2 | 7/2006 | Henderson et al. |
| 7,085,633 B2 | 8/2006 | Nishira et al. |
| 7,092,052 B2 | 8/2006 | Okamoto et al. |
| 7,095,432 B2 | 8/2006 | Nakayama et al. |
| 7,095,567 B2 | 8/2006 | Troxell et al. |
| 7,106,213 B2 | 9/2006 | White |
| 7,106,392 B2 | 9/2006 | You |
| 7,108,409 B2 | 9/2006 | DeLine et al. |
| 7,110,021 B2 | 9/2006 | Nobori et al. |
| 7,121,028 B2 | 10/2006 | Shoen et al. |
| 7,125,131 B2 | 10/2006 | Olczak |
| 7,130,727 B2 | 10/2006 | Liu et al. |
| 7,132,064 B2 | 11/2006 | Li et al. |
| 7,136,091 B2 | 11/2006 | Ichikawa et al. |
| 7,138,974 B2 | 11/2006 | Hirakata et al. |
| 7,149,613 B2 | 12/2006 | Stam et al. |
| 7,150,552 B2 | 12/2006 | Weidel |
| 7,151,515 B2 | 12/2006 | Kim et al. |
| 7,151,997 B2 | 12/2006 | Uhlmann et al. |
| 7,153,588 B2 | 12/2006 | McMan et al. |
| 7,154,657 B2 | 12/2006 | Poll et al. |
| 7,158,881 B2 | 1/2007 | McCarthy et al. |
| 7,160,017 B2 | 1/2007 | Lee et al. |
| 7,161,567 B2 | 1/2007 | Homma et al. |
| 7,167,796 B2 | 1/2007 | Taylor et al. |
| 7,168,830 B2 | 1/2007 | Pastrick et al. |
| 7,175,291 B1 | 2/2007 | Li |
| 7,176,790 B2 | 2/2007 | Yamazaki |
| 7,184,190 B2 | 2/2007 | McCabe et al. |
| 7,185,995 B2 | 3/2007 | Hatanaka et al. |
| 7,187,498 B2 | 3/2007 | Bengoechea et al. |
| 7,188,963 B2 | 3/2007 | Schofield et al. |
| 7,193,764 B2 | 3/2007 | Lin et al. |
| 7,195,381 B2 | 3/2007 | Lynam et al. |
| 7,199,767 B2 | 4/2007 | Spero |
| 7,202,987 B2 | 4/2007 | Varaprasad et al. |
| 7,206,697 B2 | 4/2007 | Olney et al. |
| 7,209,277 B2 | 4/2007 | Tonar et al. |
| 7,215,238 B2 | 5/2007 | Buck et al. |
| 7,215,473 B2 | 5/2007 | Fleming |
| 7,221,363 B2 | 5/2007 | Roberts et al. |
| 7,224,324 B2 | 5/2007 | Quist et al. |
| 7,227,472 B1 | 6/2007 | Roe |
| 7,230,523 B2 | 6/2007 | Harter, Jr. et al. |
| 7,232,231 B2 | 6/2007 | Shih |
| 7,233,304 B1 | 6/2007 | Aratani et al. |
| 7,235,918 B2 | 6/2007 | McCullough et al. |
| 7,241,030 B2 | 7/2007 | Mok et al. |
| 7,241,037 B2 | 7/2007 | Mathieu et al. |
| 7,245,207 B1 | 7/2007 | Dayan et al. |
| 7,245,231 B2 | 7/2007 | Kiefer et al. |
| 7,245,336 B2 | 7/2007 | Hiyama et al. |
| 7,248,283 B2 | 7/2007 | Takagi et al. |
| 7,248,305 B2 | 7/2007 | Ootsuta et al. |
| 7,249,860 B2 | 7/2007 | Kulas et al. |
| 7,251,079 B2 | 7/2007 | Capaldo et al. |
| 7,253,723 B2 | 8/2007 | Lindahl et al. |
| 7,255,451 B2 | 8/2007 | McCabe et al. |
| 7,255,465 B2 | 8/2007 | DeLine et al. |
| 7,259,036 B2 | 8/2007 | Borland et al. |
| 7,262,406 B2 | 8/2007 | Heslin et al. |
| 7,262,916 B2 | 8/2007 | Kao et al. |
| 7,265,342 B2 | 9/2007 | Heslin et al. |
| 7,268,841 B2 | 9/2007 | Kasajima et al. |
| 7,269,327 B2 | 9/2007 | Tang |
| 7,269,328 B2 | 9/2007 | Tang |
| 7,271,951 B2 | 9/2007 | Weber et al. |
| 7,274,501 B2 | 9/2007 | McCabe et al. |
| 7,281,491 B2 | 10/2007 | Iwamaru |
| 7,286,280 B2 | 10/2007 | Whitehead et al. |
| 7,287,868 B2 | 10/2007 | Carter et al. |
| 7,289,037 B2 | 10/2007 | Uken et al. |
| 7,290,919 B2 | 11/2007 | Pan et al. |
| 7,292,208 B1 | 11/2007 | Park et al. |
| 7,300,183 B2 | 11/2007 | Kiyomoto et al. |
| 7,302,344 B2 | 11/2007 | Olney et al. |
| 7,304,661 B2 | 12/2007 | Ishikura |
| 7,308,341 B2 | 12/2007 | Schofield et al. |
| 7,310,177 B2 | 12/2007 | McCabe et al. |
| 7,311,428 B2 | 12/2007 | DeLine et al. |
| 7,316,485 B2 | 1/2008 | Roose |
| 7,317,386 B2 | 1/2008 | Lengning et al. |

| Patent | Date | Inventor |
|---|---|---|
| 7,318,664 B2 | 1/2008 | Hatanaka et al. |
| 7,323,819 B2 | 1/2008 | Hong et al. |
| 7,324,043 B2 | 1/2008 | Purden et al. |
| 7,324,174 B2 | 1/2008 | Hafuka et al. |
| 7,324,261 B2 | 1/2008 | Tonar et al. |
| 7,327,225 B2 | 2/2008 | Nicholas et al. |
| 7,327,226 B2 | 2/2008 | Turnbull et al. |
| 7,327,855 B1 | 2/2008 | Chen |
| 7,328,103 B2 | 2/2008 | McCarthy et al. |
| 7,329,013 B2 | 2/2008 | Blank et al. |
| 7,329,850 B2 | 2/2008 | Drummond et al. |
| 7,331,415 B2 | 2/2008 | Hawes et al. |
| 7,338,177 B2 | 3/2008 | Lynam |
| 7,342,707 B2 | 3/2008 | Roberts et al. |
| 7,344,284 B2 | 3/2008 | Lynam et al. |
| 7,349,143 B2 | 3/2008 | Tonar et al. |
| 7,349,144 B2 | 3/2008 | Varaprasad et al. |
| 7,349,582 B2 | 3/2008 | Takeda et al. |
| 7,355,524 B2 | 4/2008 | Schofield |
| 7,360,932 B2 | 4/2008 | Uken et al. |
| 7,362,505 B2 | 4/2008 | Hikmet et al. |
| 7,368,714 B2 | 5/2008 | Remillard et al. |
| 7,370,983 B2 | 5/2008 | DeWind et al. |
| 7,372,611 B2 | 5/2008 | Tonar et al. |
| 7,375,895 B2 | 5/2008 | Brynielsson |
| 7,379,224 B2 | 5/2008 | Tonar et al. |
| 7,379,225 B2 | 5/2008 | Tonar et al. |
| 7,379,243 B2 | 5/2008 | Horsten et al. |
| 7,379,814 B2 | 5/2008 | Ockerse et al. |
| 7,379,817 B1 | 5/2008 | Tyson et al. |
| 7,380,633 B2 | 6/2008 | Shen et al. |
| 7,389,171 B2 | 6/2008 | Rupp |
| 7,391,563 B2 | 6/2008 | McCabe et al. |
| 7,396,147 B2 | 7/2008 | Munro |
| 7,411,732 B2 | 8/2008 | Kao et al. |
| 7,412,328 B2 | 8/2008 | Uhlmann et al. |
| 7,417,781 B2 | 8/2008 | Tonar et al. |
| 7,420,159 B2 | 9/2008 | Heslin et al. |
| 7,420,756 B2 | 9/2008 | Lynam |
| 7,429,998 B2 | 9/2008 | Kawauchi et al. |
| 7,446,462 B2 | 11/2008 | Lim et al. |
| 7,446,650 B2 | 11/2008 | Schofield et al. |
| 7,446,924 B2 | 11/2008 | Schofield et al. |
| 7,448,776 B2 | 11/2008 | Tang |
| 7,452,090 B2 | 11/2008 | Weller et al. |
| 7,453,057 B2 | 11/2008 | Drummond et al. |
| 7,455,412 B2 | 11/2008 | Rottcher |
| 7,460,007 B2 | 12/2008 | Schofield et al. |
| 7,467,883 B2 | 12/2008 | DeLine et al. |
| 7,468,651 B2 | 12/2008 | DeLine et al. |
| 7,471,438 B2 | 12/2008 | McCabe et al. |
| 7,474,963 B2 | 1/2009 | Taylor et al. |
| 7,477,439 B2 | 1/2009 | Tonar et al. |
| 7,480,149 B2 | 1/2009 | DeWard et al. |
| 7,488,080 B2 | 2/2009 | Skiver et al. |
| 7,488,099 B2 | 2/2009 | Fogg et al. |
| 7,489,374 B2 | 2/2009 | Utsumi et al. |
| 7,490,007 B2 | 2/2009 | Taylor et al. |
| 7,490,943 B2 | 2/2009 | Kikuchi et al. |
| 7,490,944 B2 | 2/2009 | Blank et al. |
| 7,494,231 B2 | 2/2009 | Varaprasad et al. |
| 7,495,719 B2 | 2/2009 | Adachi et al. |
| 7,496,439 B2 | 2/2009 | McCormick |
| 7,502,156 B2 | 3/2009 | Tonar et al. |
| 7,505,188 B2 | 3/2009 | Niiyama et al. |
| 7,511,607 B2 | 3/2009 | Hubbard et al. |
| 7,511,872 B2 | 3/2009 | Tonar et al. |
| 7,525,604 B2 | 4/2009 | Xue |
| 7,525,715 B2 | 4/2009 | McCabe et al. |
| 7,526,103 B2 | 4/2009 | Schofield et al. |
| 7,533,998 B2 | 5/2009 | Schofield et al. |
| 7,538,316 B2 | 5/2009 | Heslin et al. |
| 7,540,620 B2 | 6/2009 | Weller et al. |
| 7,541,570 B2 | 6/2009 | Drummond et al. |
| 7,542,193 B2 | 6/2009 | McCabe et al. |
| 7,543,946 B2 | 6/2009 | Ockerse et al. |
| 7,543,947 B2 | 6/2009 | Varaprasad et al. |
| 7,545,429 B2 | 6/2009 | Travis |
| 7,547,467 B2 | 6/2009 | Olson et al. |
| 7,548,291 B2 | 6/2009 | Lee et al. |
| 7,551,354 B2 | 6/2009 | Horsten et al. |
| 7,561,181 B2 | 7/2009 | Schofield et al. |
| 7,562,985 B2 | 7/2009 | Cortenraad et al. |
| 7,567,291 B2 | 7/2009 | Bechtel et al. |
| 7,571,038 B2 | 8/2009 | Butler et al. |
| 7,571,042 B2 | 8/2009 | Taylor et al. |
| 7,572,017 B2 | 8/2009 | Varaprasad et al. |
| 7,572,490 B2 | 8/2009 | Park et al. |
| 7,579,939 B2 | 8/2009 | Schofield et al. |
| 7,579,940 B2 | 8/2009 | Schofield et al. |
| 7,580,795 B2 | 8/2009 | McCarthy et al. |
| 7,581,859 B2 | 9/2009 | Lynam |
| 7,581,867 B2 | 9/2009 | Lee et al. |
| 7,583,184 B2 | 9/2009 | Schofield et al. |
| 7,586,566 B2 | 9/2009 | Nelson et al. |
| 7,586,666 B2 | 9/2009 | McCabe et al. |
| 7,589,883 B2 | 9/2009 | Varaprasad et al. |
| 7,589,893 B2 | 9/2009 | Rottcher |
| 7,600,878 B2 | 10/2009 | Blank et al. |
| 7,619,508 B2 | 11/2009 | Lynam et al. |
| 7,623,202 B2 | 11/2009 | Araki et al. |
| 7,626,749 B2 | 12/2009 | Baur et al. |
| 7,629,996 B2 | 12/2009 | Rademacher et al. |
| 7,633,567 B2 | 12/2009 | Yamada et al. |
| 7,636,188 B2 | 12/2009 | Baur et al. |
| 7,636,195 B2 | 12/2009 | Nieuwkerk et al. |
| 7,636,930 B2 | 12/2009 | Chang |
| 7,643,200 B2 | 1/2010 | Varaprasad et al. |
| 7,643,927 B2 | 1/2010 | Hils |
| 7,651,228 B2 | 1/2010 | Skiver et al. |
| 7,658,521 B2 | 2/2010 | DeLine et al. |
| 7,663,798 B2 | 2/2010 | Tonar et al. |
| 7,667,579 B2 | 2/2010 | DeLine et al. |
| 7,670,016 B2 | 3/2010 | Weller et al. |
| 7,688,495 B2 | 3/2010 | Tonar et al. |
| 7,695,174 B2 | 4/2010 | Takayanagi et al. |
| 7,696,964 B2 | 4/2010 | Lankhorst et al. |
| 7,706,046 B2 | 4/2010 | Bauer et al. |
| 7,710,631 B2 | 5/2010 | McCabe et al. |
| 7,711,479 B2 | 5/2010 | Taylor et al. |
| 7,724,434 B2 | 5/2010 | Cross et al. |
| 7,726,822 B2 | 6/2010 | Blank et al. |
| 7,728,276 B2 | 6/2010 | Drummond et al. |
| 7,728,721 B2 | 6/2010 | Schofield et al. |
| 7,728,927 B2 | 6/2010 | Nieuwkerk et al. |
| 7,731,403 B2 | 6/2010 | Lynam et al. |
| 7,734,392 B2 | 6/2010 | Schofield et al. |
| 7,742,864 B2 | 6/2010 | Sekiguchi |
| 7,746,534 B2 | 6/2010 | Tonar et al. |
| 7,771,061 B2 | 8/2010 | Varaprasad et al. |
| 7,787,077 B2 | 8/2010 | Kondoh et al. |
| 7,791,694 B2 | 9/2010 | Molsen et al. |
| 7,815,326 B2 | 10/2010 | Blank et al. |
| 7,821,697 B2 | 10/2010 | Varaprasad et al. |
| 7,822,543 B2 | 10/2010 | Taylor et al. |
| 7,826,123 B2 | 11/2010 | McCabe et al. |
| 7,830,583 B2 | 11/2010 | Neuman et al. |
| 7,832,882 B2 | 11/2010 | Weller et al. |
| 7,842,154 B2 | 11/2010 | Lynam |
| 7,854,514 B2 | 12/2010 | Conner et al. |
| 7,855,755 B2 | 12/2010 | Weller et al. |
| 7,859,565 B2 | 12/2010 | Schofield et al. |
| 7,859,737 B2 | 12/2010 | McCabe et al. |
| 7,864,398 B2 | 1/2011 | Dozeman et al. |
| 7,864,399 B2 | 1/2011 | McCabe et al. |
| 7,871,169 B2 | 1/2011 | Varaprasad et al. |
| 7,873,593 B2 | 1/2011 | Schofield et al. |
| 7,888,629 B2 | 2/2011 | Heslin et al. |
| 7,898,398 B2 | 3/2011 | DeLine et al. |
| 7,898,719 B2 | 3/2011 | Schofield et al. |
| 7,903,324 B2 | 3/2011 | Kobayashi et al. |
| 7,903,335 B2 | 3/2011 | Nieuwkerk et al. |
| 7,906,756 B2 | 3/2011 | Drummond et al. |
| 7,914,188 B2 | 3/2011 | DeLine et al. |
| 7,916,009 B2 | 3/2011 | Schofield et al. |
| 7,916,380 B2 | 3/2011 | Tonar et al. |
| 7,918,570 B2 | 4/2011 | Weller et al. |
| 7,926,960 B2 | 4/2011 | Skiver et al. |

| | | | |
|---|---|---|---|
| 7,937,667 B2 | 5/2011 | Kramer et al. | |
| 2001/0026316 A1 | 10/2001 | Senatore | |
| 2002/0049535 A1 | 4/2002 | Rigo et al. | |
| 2002/0085155 A1 | 7/2002 | Arikawa | |
| 2002/0092958 A1 | 7/2002 | Lusk | |
| 2002/0118321 A1 | 8/2002 | Ge | |
| 2002/0133144 A1 | 9/2002 | Chan et al. | |
| 2002/0149727 A1 | 10/2002 | Wang | |
| 2002/0154007 A1 | 10/2002 | Yang | |
| 2003/0002165 A1 | 1/2003 | Mathias et al. | |
| 2003/0007261 A1 | 1/2003 | Hutzel et al. | |
| 2003/0030724 A1 | 2/2003 | Okamoto | |
| 2003/0069690 A1 | 4/2003 | Correia et al. | |
| 2003/0090568 A1 | 5/2003 | Pico | |
| 2003/0090569 A1 | 5/2003 | Poechmueller | |
| 2003/0098908 A1 | 5/2003 | Misaiji et al. | |
| 2003/0103142 A1 | 6/2003 | Hitomi et al. | |
| 2003/0122929 A1 | 7/2003 | Minuado et al. | |
| 2003/0133014 A1 | 7/2003 | Mendoza | |
| 2003/0137586 A1 | 7/2003 | Lewellen | |
| 2003/0156193 A1 | 8/2003 | Nakamura | |
| 2003/0169158 A1 | 9/2003 | Paul, Jr. | |
| 2003/0179293 A1 | 9/2003 | Oizumi | |
| 2003/0202096 A1 | 10/2003 | Kim | |
| 2003/0206256 A1 | 11/2003 | Drain et al. | |
| 2003/0214576 A1 | 11/2003 | Koga | |
| 2003/0214584 A1 | 11/2003 | Ross, Jr. | |
| 2003/0227546 A1 | 12/2003 | Hilborn et al. | |
| 2004/0004541 A1 | 1/2004 | Hong | |
| 2004/0027695 A1 | 2/2004 | Lin | |
| 2004/0036768 A1 | 2/2004 | Green | |
| 2004/0077359 A1 | 4/2004 | Bernas et al. | |
| 2004/0080404 A1 | 4/2004 | White | |
| 2004/0239849 A1 | 12/2004 | Wang | |
| 2005/0024591 A1 | 2/2005 | Lian et al. | |
| 2005/0117095 A1 | 6/2005 | Ma | |
| 2005/0168995 A1 | 8/2005 | Kittlemann et al. | |
| 2005/0237440 A1 | 10/2005 | Sugimura et al. | |
| 2005/0270766 A1 | 12/2005 | Kung et al. | |
| 2006/0001641 A1 | 1/2006 | Degwekar et al. | |
| 2006/0050018 A1 | 3/2006 | Hutzel et al. | |
| 2006/0061008 A1 | 3/2006 | Karner et al. | |
| 2006/0076860 A1 | 4/2006 | Hoss | |
| 2006/0139953 A1 | 6/2006 | Chou et al. | |
| 2006/0171704 A1 | 8/2006 | Bingle et al. | |
| 2007/0064108 A1 | 3/2007 | Haler | |
| 2007/0080585 A1 | 4/2007 | Lyu | |
| 2007/0183037 A1 | 8/2007 | De Boer et al. | |
| 2007/0262732 A1 | 11/2007 | Shen | |
| 2008/0002106 A1 | 1/2008 | Van De Witte et al. | |
| 2008/0030311 A1 | 2/2008 | Dayan et al. | |
| 2008/0068520 A1 | 3/2008 | Minikey, Jr. et al. | |
| 2008/0180529 A1 | 7/2008 | Taylor et al. | |
| 2008/0231704 A1 | 9/2008 | Schofield et al. | |
| 2008/0266389 A1 | 10/2008 | DeWind et al. | |
| 2009/0002491 A1 | 1/2009 | Haler | |
| 2009/0040778 A1 | 2/2009 | Takayanagi et al. | |
| 2009/0052003 A1 | 2/2009 | Schofield et al. | |
| 2009/0085729 A1 | 4/2009 | Nakamura et al. | |
| 2009/0096937 A1 | 4/2009 | Bauer et al. | |
| 2009/0184904 A1 | 7/2009 | S. et al. | |
| 2009/0201137 A1 | 8/2009 | Weller et al. | |
| 2009/0243824 A1 | 10/2009 | Hook et al. | |
| 2009/0244740 A1 | 10/2009 | Takayanagi et al. | |
| 2009/0262192 A1 | 10/2009 | Schofield et al. | |
| 2009/0290369 A1 | 11/2009 | Schofield et al. | |
| 2009/0296190 A1 | 12/2009 | Anderson et al. | |
| 2010/0045790 A1 | 2/2010 | Lynam et al. | |
| 2010/0045899 A1 | 2/2010 | Ockerse | |
| 2010/0110523 A1 | 5/2010 | Varaprasad et al. | |
| 2010/0110553 A1 | 5/2010 | Anderson et al. | |
| 2010/0194890 A1 | 8/2010 | Weller et al. | |
| 2010/0195226 A1 | 8/2010 | Heslin et al. | |
| 2010/0201896 A1 | 8/2010 | Ostreko et al. | |
| 2010/0214662 A1 | 8/2010 | Takayanagi et al. | |
| 2010/0245701 A1 | 9/2010 | Sato et al. | |
| 2010/0246017 A1 | 9/2010 | Tonar et al. | |
| 2010/0277786 A1 | 11/2010 | Anderson et al. | |
| 2011/0109746 A1 | 5/2011 | Schofield et al. | |
| 2011/0141543 A1 | 6/2011 | Uken et al. | |

FOREIGN PATENT DOCUMENTS

| | | |
|---|---|---|
| CN | 1189224 | 7/1998 |
| DE | 941408 | 4/1956 |
| DE | 944531 | 7/1956 |
| DE | 7323996 | 11/1973 |
| DE | 3248511 A1 | 7/1984 |
| DE | 3301945 | 7/1984 |
| DE | 3614882 | 11/1987 |
| DE | 9306989.8 U1 | 7/1993 |
| DE | 4329983 | 8/1995 |
| DE | 4444443 A1 | 6/1996 |
| DE | 29703084 U1 | 6/1997 |
| DE | 29805142 U1 | 5/1998 |
| DE | 19741896 | 4/1999 |
| DE | 19755008 | 7/1999 |
| DE | 29902344 U1 | 7/1999 |
| DE | 19934999 | 2/2001 |
| DE | 19943355 | 3/2001 |
| DE | 20118868 | 3/2002 |
| DE | 10131459 | 1/2003 |
| EP | 0299509 A2 | 1/1989 |
| EP | 0513476 A1 | 11/1992 |
| EP | 0524766 | 1/1993 |
| EP | 0729864 A1 | 12/1995 |
| EP | 0728618 A2 | 8/1996 |
| EP | 0825477 | 2/1998 |
| EP | 0830985 | 3/1998 |
| EP | 0928723 A2 | 7/1999 |
| EP | 937601 A2 | 8/1999 |
| EP | 1075986 | 2/2001 |
| EP | 1097848 A | 5/2001 |
| EP | 1152285 A2 | 11/2001 |
| EP | 1256833 | 11/2002 |
| EP | 0899157 | 10/2004 |
| EP | 1315639 | 2/2006 |
| FR | 1021987 A | 2/1953 |
| FR | 1461419 | 12/1966 |
| FR | 2585991 | 2/1987 |
| FR | 2672857 A1 | 8/1992 |
| FR | 2673499 A1 | 9/1992 |
| FR | 2759045 | 8/1998 |
| GB | 810010 | 3/1959 |
| GB | 934037 | 8/1963 |
| GB | 1008411 | 10/1965 |
| GB | 1136134 | 12/1968 |
| GB | 1553376 | 9/1979 |
| GB | 2137573 A | 10/1984 |
| GB | 2161440 | 1/1986 |
| GB | 2192370 | 1/1988 |
| GB | 2222991 | 3/1990 |
| GB | 2255539 A | 11/1992 |
| GB | 2351055 A | 12/2000 |
| GB | 2362494 | 11/2001 |
| JP | 50-000638 A | 1/1975 |
| JP | 52-146988 | 11/1977 |
| JP | 55-039843 | 3/1980 |
| JP | 57-30639 | 2/1982 |
| JP | 57-208530 | 12/1982 |
| JP | 58-030729 | 2/1983 |
| JP | 58-110334 | 6/1983 |
| JP | 58-180347 | 10/1983 |
| JP | 58-209635 | 12/1983 |
| JP | 59-114139 | 7/1984 |
| JP | 60-212730 | 10/1985 |
| JP | 60-261275 | 12/1985 |
| JP | 61127186 | 6/1986 |
| JP | 61-260217 | 11/1986 |
| JP | 62-043543 | 2/1987 |
| JP | 62-075619 | 4/1987 |
| JP | 62-122487 | 6/1987 |
| JP | 63-02753 | 1/1988 |
| JP | 63-106730 | 5/1988 |
| JP | 63-106731 | 5/1988 |
| JP | 63-274286 | 11/1988 |
| JP | 64-14700 | 1/1989 |

| | | |
|---|---|---|
| JP | 01-123587 | 5/1989 |
| JP | 02-122844 | 10/1990 |
| JP | 03-28947 | 3/1991 |
| JP | 03-052097 | 3/1991 |
| JP | 30-061192 | 3/1991 |
| JP | 03-110855 | 5/1991 |
| JP | 03-243914 | 10/1991 |
| JP | 04-114587 | 4/1992 |
| JP | 04-245886 | 9/1992 |
| JP | 05-213113 | 8/1993 |
| JP | 05-257142 | 10/1993 |
| JP | 60-80953 A | 3/1994 |
| JP | 61-07035 A | 4/1994 |
| JP | 62-27318 A | 8/1994 |
| JP | 06-318734 | 11/1994 |
| JP | 07-175035 | 7/1995 |
| JP | 07-266928 | 10/1995 |
| JP | 07-277072 | 10/1995 |
| JP | 07-281185 | 10/1995 |
| JP | 08-008083 | 1/1996 |
| JP | 08-083581 | 3/1996 |
| JP | 08-216789 | 8/1996 |
| JP | 09-260074 | 3/1997 |
| JP | 05-077657 | 7/1997 |
| JP | 09-220976 | 8/1997 |
| JP | 09-266078 | 10/1997 |
| JP | 09-288262 | 11/1997 |
| JP | 10-076880 | 3/1998 |
| JP | 10-199480 | 7/1998 |
| JP | 10-206643 | 8/1998 |
| JP | 11-038381 | 2/1999 |
| JP | 11-067485 | 3/1999 |
| JP | 11-078693 | 3/1999 |
| JP | 11-109337 | 4/1999 |
| JP | 11-160539 | 6/1999 |
| JP | 11-212073 | 8/1999 |
| JP | 11-283759 | 10/1999 |
| JP | 11-298058 | 10/1999 |
| JP | 11-305197 | 11/1999 |
| JP | 2000-131681 | 5/2000 |
| JP | 2000-153736 | 6/2000 |
| JP | 2000-159014 | 6/2000 |
| JP | 2000-255321 | 9/2000 |
| JP | 2000-330107 | 11/2000 |
| JP | 2001-083509 | 3/2001 |
| JP | 2001-222005 | 8/2001 |
| JP | 2002-072901 | 3/2002 |
| JP | 2002-120649 | 4/2002 |
| JP | 2002-122860 | 4/2002 |
| JP | 2002-162626 | 6/2002 |
| JP | 2002-352611 | 12/2002 |
| JP | 2003-267129 | 9/2003 |
| JP | 2004-182156 | 7/2004 |
| JP | 2005-148119 | 6/2005 |
| JP | 2005-327600 | 11/2005 |
| JP | 38-46073 | 11/2006 |
| WO | WO 82/02448 | 7/1982 |
| WO | WO 86/06179 | 10/1986 |
| WO | WO8606179 | 10/1986 |
| WO | WO 94/19212 | 9/1994 |
| WO | WO 96/21581 | 7/1996 |
| WO | WO 98/14974 | 4/1998 |
| WO | WO 98/38547 | 9/1998 |
| WO | WO 99/15360 | 4/1999 |
| WO | WO 00/23826 | 4/2000 |
| WO | WO 00/52661 | 9/2000 |
| WO | WO 00/55685 | 9/2000 |
| WO | WO 01/01192 | 1/2001 |
| WO | WO 02/18174 | 3/2002 |
| WO | WO 02/49881 | 6/2002 |
| WO | WO 03/021343 | 3/2003 |

OTHER PUBLICATIONS

Edgar, Julian; Goodbye 12 Volts . . . Hello 42 Volts!; Oct. 5, 1999; Autospeed 50; Issue 50; www.autospeed.co.nz/cms/A__0319/article.html.

Kobe, Gerry; 42 Volts Goes Underhood; Mar. 2000; Automotive Industries; Cahners Publishing Company; www.findarticles.com/p/articles/mi__m3012/is_3__180/ai_61361677.

Jewett, Dale; Aug. 2000; Automotive Industries; Cahners Publising Company; www.findarticles.com/p/articles/mi__m3012/is_8__180ai__64341779.

National Semiconductor, LM78S40, Universal Switching Regulator Subsystem, National Semiconductor Corporation, Apr. 1996, p. 6.

Dana H. Ballard and Christopher M. Brown, Computer Vision, Prentice-Hall, Englewood Cliffs, New Jersey, 5 pages, 1982.

G. Wang, D. Renshaw, P.B. Denyer and M. Lu, CMOS Video Cameras, article, 1991, 4 pages, University of Edinburgh, UK.

N.R. Lynam, "Electrochromic Automotive Day/Night Mirror," *SAE Technical Paper Series*, 870636 (1987).

N. R. Lynam, "Smart Windows for Automobiles," *SAE Technical Paper Series*, 900419 (1990).

N.R. Lynam and A. Agrawal, "Automotive Applications of Chromogenic Materials," from *Large Area Chromogenics: Materials and Devices for Transmittance Control*, C.M. Lampert and C.G. Granquist, EDS, Optical Engineering Press, Washington (1990).

Kobe, Gerry, "Hypnotic Wizardry! (interior electronics)," *Automotive Industries*, vol. 169; No. 5, p. 60, published May 1989. Relevant section is entitled "Instrumentation."

SAE Information Report, "Vision Factors Considerations in Rear View Mirror Design—SAE J985 OCT88," approved Oct. 1988, and located in *1995 SAE Handbook*, vol. 3.

T. Alfey, Jr. et al., "Physical Optics of Iridescent Multilayered Plastic Films", *Polym. Eng'g & Sci.*, 9(6), 400-04 (1969).

I.F. Chang, "Electrochromic and Electrochemichromic Materials and Phenomena" in *Nonemissive Electrooptic Displays*, 155-96, A.R. Kmetz and F.K. von Willisen, eds., Plenum Press, New York (1976).

C.M. Lampert, "Electrochromic Materials and Devices for Energy Efficient Windows", *Solar Energy Mat'ls*, 11, 1-27 (1984).

Nagai et al., *"Transmissive Electrochromic Device", Opt. Mat'ls. Tech for Energy Effic. And Solar Energy Conv. IV*, 562, 39-45, C.M. Lampert, ed., SPIE—The Int'l Soc. for Opt. Eng'g (1985).

W. Schrenk et al., "Coextruded Elastomeric Optical Interference Film", *ANTEC '88*, 1703-07 (1988).

European Search Report dated Aug. 28, 2003, in European Application No. EP 00 65 0114, Publication No. EP 1 097 848, published May 9, 2001.

U.S. Appl. No. 08/720,237, filed Sep. 26, 1996, entitle Automotive Pyroelectric Intrusion Detection, abandoned.

"Combination of rain sensing, autolamps and telephone antenna in one module," Research Disclosure, Kenneth Mason Publications, Hampshire, GB No. 412, Aug. 1998, p. 1045XP-000824825.

Product Brochure entitled "SideMinder," published in 1993 by Autosense.

European Search Report for European Patent Application No. 98650054.4-1523 of Dec. 9, 1998.

\* cited by examiner

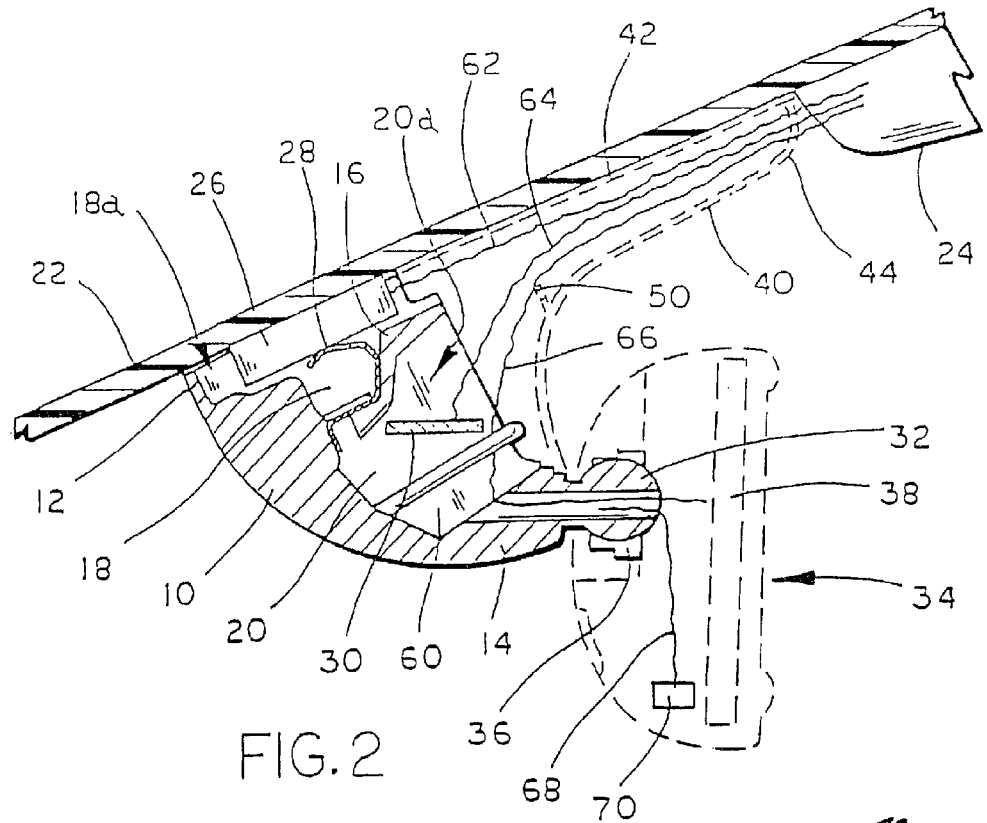

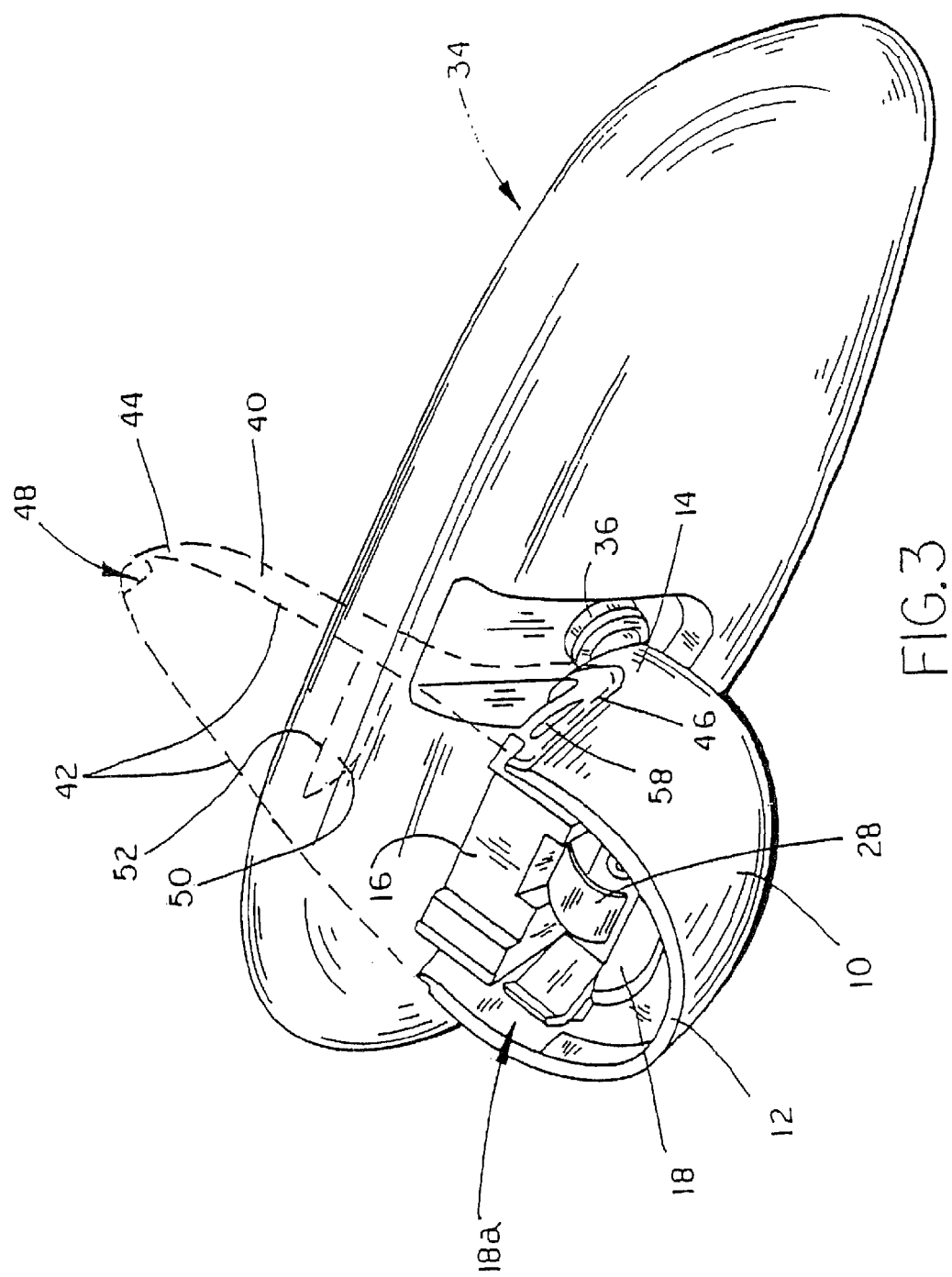

VEHICULAR HAVING A CAMERA, A RAIN SENSOR AND A SINGLE-BALL INTERIOR ELECTROCHROMIC MIRROR ASSEMBLY ATTACHED AT AN ATTACHMENT ELEMENT

CROSS REFERENCE TO RELATED APPLICATIONS

The present application is a continuation of U.S. patent application Ser. No. 13/026,591, filed Feb. 14, 2011, now U.S. Pat. No. 7,994,471, which is a continuation of U.S. patent application Ser. No. 12/467,660, filed May 18, 2009, now U.S. Pat. No. 7,888,629, which is a continuation of U.S. patent application Ser. No. 12/197,660, filed Aug. 25, 2008, now U.S. Pat. No. 7,538,316, which is a continuation of U.S. patent application Ser. No. 11/828,880, filed Jul. 26, 2007, now U.S. Pat. No. 7,420,159, which is a continuation of U.S. patent application Ser. No. 11/699,271, filed Jan. 29, 2007, now U.S. Pat. No. 7,265,342, which is a continuation of U.S. patent application Ser. No. 11/418,906, filed May 5, 2006, now U.S. Pat. No. 7,262,406, which is a continuation of U.S. patent application Ser. No. 10/913,748, filed Aug. 6, 2004, now U.S. Pat. No. 7,041,965, which is a continuation of U.S. patent application Ser. No. 10/618,334, filed Jul. 11, 2003, now U.S. Pat. No. 6,774,356, which is a continuation of U.S. patent application Ser. No. 09/997,579, filed Nov. 29, 2001, now U.S. Pat. No. 6,593,565, which is a continuation of U.S. patent application Ser. No. 09/433,467, filed Nov. 4, 1999, now U.S. Pat. No. 6,326,613, which is a continuation-in-part of U.S. patent application Ser. No. 09/003,966, filed Jan. 7, 1998, by Niall R. Lynam, now U.S. Pat. No. 6,250,148, the disclosures of which are hereby incorporated by reference herein.

BACKGROUND AND SUMMARY OF THE INVENTION

This invention relates to a vehicle interior mirror assembly.

According to the invention there is provided a vehicle interior rearview mirror assembly comprising a housing having a front end for releasable attachment to the interior surface of the vehicle windshield, a rear end having connection means for adjustably mounting a rearview mirror unit to the housing, the housing adapted for containing a rain sensor and biasing means in use biasing the rain sensor into contact with the interior surface of the windshield, the housing containing at least one further electrical component.

The invention further provides a vehicle interior rearview mirror assembly comprising a housing having a front end for releasable attachment to the interior surface of the vehicle windshield, a rear end having connection means for adjustably mounting a rearview mirror unit to the housing, the interior of the housing comprising at least one compartment, the compartment having an opening at the front end of the housing for facing in use towards the windshield and, the compartment adapted for containing a rain sensor and for biasing the rain sensor forwardly through the first opening into contact with the interior surface of the windshield, and the housing also containing at least one further electrical component.

The invention further provides a vehicle interior rearview mirror assembly comprising a housing having a front end for releasable attachment to the interior surface of the vehicle windshield, a rear end having connection means for adjustably mounting a rearview mirror unit to the housing, the interior of the housing comprising a compartment, the compartment having a first opening at the front end of the housing for facing in use towards the windshield and the compartment having a second opening on at least one side of the housing, the compartment containing a rain sensor and means for biasing the rain sensor forwardly through the first opening into contact with the interior surface of the windshield, and the compartment containing at least one further electrical component accessible through the second opening According to the present invention there is provided a vehicle interior rearview mirror assembly comprising a housing having a front end for releasable attachment to the interior surface of the vehicle windshield, a rear end having connection means for mounting a rearview mirror unit to the housing, and an internal wall subdividing the interior of the housing into first and second compartments, the first compartment having a first opening at the front end of the housing for facing in use towards the windshield and the second compartment having a second opening on at least one side of the housing, the first compartment containing a rain sensor and means for biasing the rain sensor forwardly through the first opening into contact with the interior surface of the windshield, and the second compartment containing at least one further electrical component accessible through the second opening.

The invention further provides a vehicle interior rearview mirror assembly comprising a housing having a front end for releasable attachment to the interior surface of the vehicle windshield, a rear end having connection means for releasably mounting a rearview mirror unit to the housing, a first opening at the front end of the housing for facing in use towards the windshield, and a second opening on at least one side of the housing for facing in use towards the top edge of the windshield, the housing containing a rain sensor, means for biasing the rain sensor forwardly through the first opening into contact with the interior surface of the windshield, and at least one further electrical component accessible through the second opening. The assembly further preferably including a removable cover which mates with the housing around the second opening and in use preferably extends along the windshield towards the vehicle header, and electrical leads for the rain sensor and the further electrical component which in use are routed under the cover to the header.

The invention provides the significant advantage that a vehicle manufacturer is provided with the possibility of optionally including a variety of components with the rear view mirror assembly. This possibility is made available for example during the assembly line process where the desired components to meet a particular specification can be included in the rear view mirror assembly. Furthermore, the removable cover readily provides for the functional advantage of readily incorporating a selected component whilst at the same time providing a functionally attractive cover. The automaker is therefore provided with the considerable advantage of the possibility of providing a plurality of diverse options quickly and speedily during the assembly line process.

An embodiment of the invention will now be described, by way of example, with reference to the accompanying drawings, in which:

BRIEF DESCRIPTION OF THE DRAWINGS

FIG. 1 is a side view of an embodiment of a vehicle interior mirror assembly according to the invention attached to the interior surface of a windshield;

FIG. 2 is a cross-section through the mirror assembly of FIG. 1;

FIG. 3 is a perspective top view of the mirror assembly;

Figure 4:
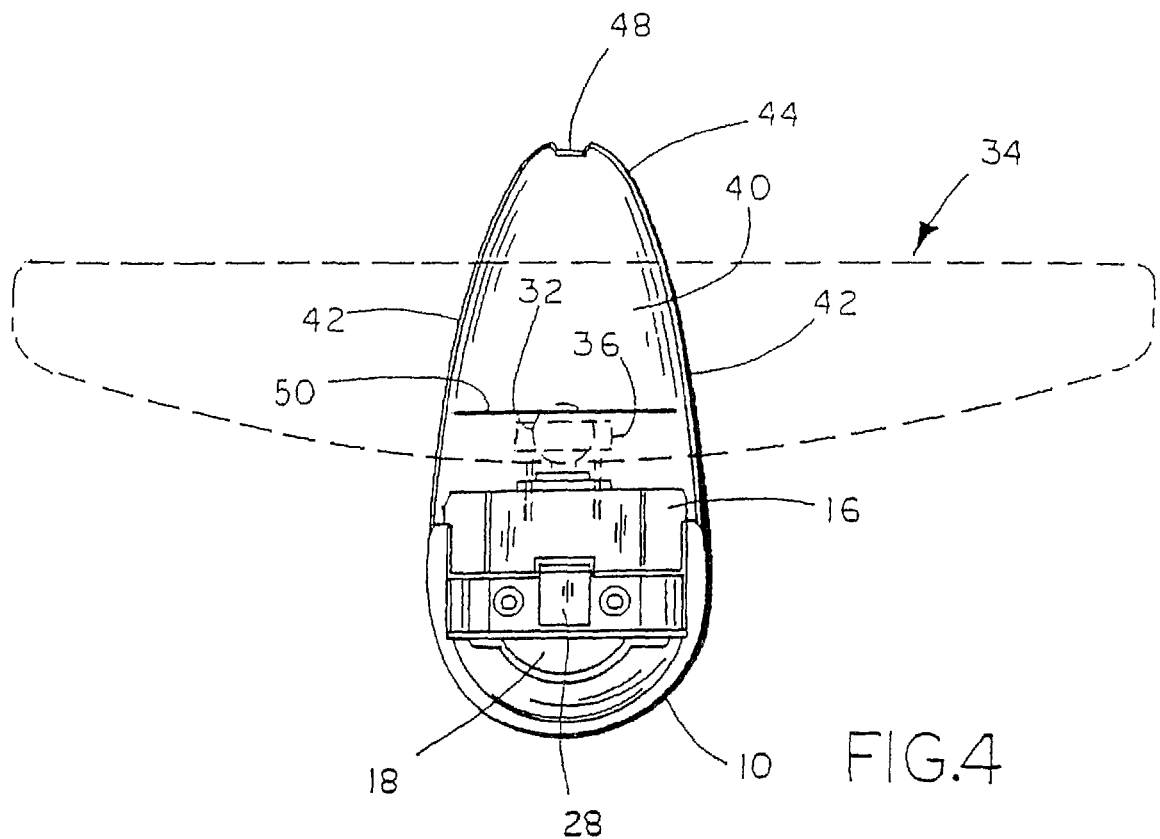
FIG. 4 is a view of the mirror assembly of FIG. 3 looking into the opening 18.

In certain of the figures some components are omitted or shown in dashed outline to reveal the underlying structure.

DESCRIPTION OF THE PREFERRED EMBODIMENTS

Referring to the drawings, a vehicle interior rearview mirror assembly comprises a die cast metal housing 10 (or optionally may be formed from a plastic moulding such as engineering polymeric resin such as a filled nylon or the like) having a front end 12 and a rear end 14, the front end 12 being releasably attached to the interior surface of the vehicle windshield 22 in a manner to be described. The interior of the housing 10 is subdivided by an internal wall 16 into first and second compartments 18, 20 respectively, the first compartment 18 having an opening 18a at the front end of the housing 10 which in use, and as shown in FIGS. 1 and 2, faces towards the windshield 22 and the second compartment having an opening 20a on the side of the housing which in use faces towards the vehicle header 24 at the top edge of the windshield. The front end 12 of the housing 10 is releasably attached to the windshield 22 using an annular mounting button, not shown, in the manner described in EP 0 928 723 and U.S. patent application Ser. No. 09/003,966, entitled "Rain Sensor Mount for Use in a Vehicle" to Niall R Lynam, now U.S. Pat. No. 6,250,148, the disclosures of which are incorporated herein by reference.

As shown in the various figures of the Ser. No. 09/003,966 application, it is desirable that the rain sensor mounting member attached to the windshield and the rearview mirror mounting button provided on the rain sensor module are generally aligned along a common axis when the rain sensor module is mounted to the vehicle in order to provide a mounting of a rearview mirror assembly to the rain sensor module that is generally coaxial with the mounting of the rain sensor module to the windshield. Optionally, a ceramic black fit layer, as is commonly known in the windshield fabrication art, can be used on the inner surface of the windshield to hide the attachment location of the rain sensor module. However, the center portion of such a ceramic layer should include a central opening or at least provide efficient transmission for the output of the light emitters and the rain sensor unit at the point of contact of its detecting surface to the windshield or to an adhesive layer. The rain sensor module assembly includes the rain sensor unit, which is positioned in the housing and projects through an opening or port provided on a windshield facing side of the housing and extends through an inner hollow open central portion of the rain sensor mounting button to contact the inner surface of the windshield. The rain sensor unit preferably comprises a compact rain sensor unit available from ITT Automotive Europe, GMBH of Frankfurt, Germany. The rain sensor unit includes a detecting surface which projects through an opening provided in adhesive layer so that direct contact is achieved between the inner surface of the windshield and the detecting surface of the rain sensor unit, and also includes a light emitting source and a light detecting source along with associated electronic circuitry for generating an electrical signal indicative of detection of moisture on the outer surface of the windshield. Light emitted by the emitter passes through the rain sensor detecting surface and is refracted at the outer windshield surface, and re-enters the rain sensor at its detecting surface to impinge the light detector of the rain sensor, whose output is processed by electronic circuitry to detect the presence/absence of moisture on the windshield. The circuitry (in whole or in part) can be contained in the rain sensor and/or within the housing of the module. Optionally, the electronic circuitry can be located/share components with/receive input from or deliver output electrical accessories in the vehicle, such as a CAN bus, electronically equipped mirrors such as lighted mirror and automatic dimming electrochromic mirrors, overhead consoles, and similar electrically functioning vehicle components. Electrical connectors can be accommodated at the rain sensor module, such as at or on its housing. The rain sensor can be separately removable from the module for service, or can be an integral part of the module so that a unitary module is provided by a supplier to the automaker for mating with a windshield mounting member as the vehicle passes along the vehicle assembly line (or at a local ready-to-install windshield supply plant), and thereafter for attachment thereto of a rearview mirror assembly. The electrical signal output by the rain sensor can be used to automatically operate the wiper system for the windshield and/or the backlite, or operate other vehicular functions such as close a sunroof in the event of rain or change the braking and/or traction characteristics of the vehicle braking and/or traction control systems.

Optionally, and as described in the Ser. No. 09/003,966 application, the mount includes an annular or like member having a central opening and is adapted to mount the housing to the inner surface of the windshield. The port of the housing is aligned with the central opening of the annular member so that the rain sensor can extend through the port and through the central opening and contact the inner windshield surface for detecting moisture on an outer surface of the vehicle windshield. The housing is preferably releasably secured to the annular member so that the rain sensor can be serviced or replaced. In addition, at least the second side of the housing substantially covers and conceals the annular member. The rain sensor mount includes a housing having a cover, which covers an access opening in the housing, a means for mounting a rearview mirror assembly to the housing, and a rain sensor, which is positioned in the housing and includes a detecting surface. Furthermore, a biasing member is interposed between a portion of the housing and the rain sensor for urging the detecting surface of the rain sensor to optical couple to the windshield of the vehicle for detecting moisture on an outer surface of the windshield.

Optionally, and as described in the Ser. No. 09/003,966 application, the housing of the rain sensor module assembly is preferably releasably or removably mounted or attached to the rain sensor mounting button by attachment to a solid portion of the rain sensor mounting button, for example by mechanical means such as by snap-on or twist-on attachment or, alternatively, by a releasable adhesive layer. The rain sensor mounting button may comprise of a variety of shapes including square, rectangular, trapezoidal, triangular and the like, with a central opening through which the rain sensor unit extends to position the detecting surface into contact with either the inner surface of the windshield or the outer surface of the adhesive layer. Preferably, the outer rim of the rain sensor mounting button has a smooth edge radius for safety purposes, for example an edge radius of greater than or equal to two millimeters. Also, the attachment of the rain sensor module to the rain sensor mounting button is preferably a breakaway mount, which meets government and automaker safety requirements upon impact during an accident. The mounting member attached to the vehicle windshield such as the rain sensor mounting button can have a wide variety of shapes and forms. It is desirable that there be an adequate contact area with the windshield surface to assure long term integrity of the joint thereto under the loading conditions experienced during lifetime use in the vehicle. The weight of the rearview mirror assembly attached to the mirror mounting button of the rain sensor module can vary from about 100 grams to about 500 grams, or even higher dependent on the feature content of the mirror assembly. The rain sensor module itself is preferably fabricated of lightweight materials, and preferably weighs less than about 100 grams, more preferably less than about 50 grams, and most preferably less that about 25 grams. The mounting member may have a contiguous perimetal portion encompassing a central opening (such as an annulus with a central hole transverse therethrough so that a portion of the inner surface of the windshield is exposed thereat), or the mounting member can be non-contiguous (for example, two spaced apart rails attached to the windshield encompassing an opening therebetween where the detecting surface of the rain sensor can contact the windshield, or the mounting member can be a single rail with an adjacent portion of the inner surface of the windshield serving as the opening for contacting of the rain sensor to the windshield). Also, the rain sensor module can be received on the mounting member such that its engagement on the support attached to the windshield causes the detecting surface of the rain sensor to be urged forward towards, and to contact, the windshield. The module itself, in cooperation with its mounting member on the windshield, serves at least partially as a biasing member, Optionally, and as described in the Ser. No. 09/003,966 application, the rain sensor module assembly is mounted to the inner surface of the windshield by a rain sensor mounting button. The rain sensor mounting button is preferably adhered to the inner surface of the windshield by a layer of adhesive such as an epoxy, a polyvinyl butyral, a urethane, or a silicone adhesive material or the like. The rain sensor mounting button may be circular in shape having a solid annular outer portion and an inner hollow open central portion. The solid portion of the rain sensor mounting button may comprise a polymer material, such as an engineering resin, a nylon or an ABS material, or can be a metal fabrication such as zinc casting or a sintered steel pressing or equivalent metal material such as steel, titanium, nickel, aluminum and their alloys, or the like.

Optionally, and as described in the Ser. No. 09/003,966 application, a first end of the housing is preferably adapted to rotate or twist onto the rain sensor mounting button and is, preferably, mounted to the rain sensor mounting button in a break-away mounting so that the housing and the interior mirror assembly will detach from the rain sensor mounting button when any one of the housing and the mirror assembly are impacted. The mirror mounting button is mounted to a second end of housing or may be integrally molded therewith.

The compartment 18 contains a rain sensor 26, preferably a compact rain sensor module available from ITT Automotive Europe GmbH of Frankfurt, Germany. The compartment 18 preferably also contains an arcuate steel spring finger 28 which is secured to the base of the compartment 18 behind the rain sensor 26 and preferably serves to bias the rain sensor 26 through the aperture in the mounting button and the opening 18a into optical contact with the windshield 22. Most preferably, rain sensor 26 is a module which has a cross section diameter of at least 25 millimeters (mm), more preferably at least 30 mm, but with a maximum diameter $\leq$50 mm, more preferably $\leq$40 mm, and most preferably $\leq$35 mm.

The compartment 20 contains at least one further electrical component which is accessible through the opening 20a. In the present embodiment the component is a printed circuit board 30 bearing a compass sensor such as a flux gate, magnetoinductive, magnetoresistive or magnetocapacitive sensor.

At its rear end 14 the housing 10 has an integral ball 32 for releasably and adjustably mounting a rearview mirror unit 34 to the housing 10 generally in conventional manner. The mirror unit 34 comprises a mirror housing 36 containing a mirror 38 which is preferably an electro-optic mirror comprising front and rear plates separated by a space which contains an electro-optic medium such as an electrochromic medium allowing variation in the amount of light transmitted through the medium by varying the strength of an electric field applied across the medium. Alternatively a prismatic mirror element can be used. Such mirrors are well known in the art. The ball 32 constitutes one part of a ball and socket joint, the socket 36 being carried by the mirror housing 36. The mirror housing is adjustable about the ball and socket joint. Advantageously, the housing 10 is fixedly attached to the windshield when mounted thereto. Thus, adjustment of the mirror housing to set the field of rearward view of the mirror reflective element therein does not effect the position/orientation of rain sensor and any other accessory housed in fixedly-attached housing 10. This is particularly advantageous when the electrical accessory in housing 10 comprises a compass sensor such as a magneto-resistive sensor, a magneto-inductive sensor, a magneto-capacitive sensor or a flux-gate sensor. By having the housing 10 be fixedly attached, and by having it accommodate at least two electrical accessories (at least one of which preferably comprises a rain sensor that is mounted in the housing 10 so as to view through and preferably contact the windshield inner surface, and with the rain sensor attached to the windshield generally coaxial with the mirror unit that is adjustable about housing 10), a compact overall interior mirror system is provided comprising a housing accommodating a plurality of electrical accessories, the housing fixedly and detachably mounted to a receiving structure on the inner surface (typically a glass surface) of the vehicle windshield and with a mirror unit comprising a mirror support arm and a mirror housing including a reflector element, the mirror support at to/mirror housing being adjustable about the fixed housing (and optionally detachable therefrom). In this manner, the housing 10 presents a minimal footprint when viewed from outside the vehicle through the vehicle windshield.

Figure 7:
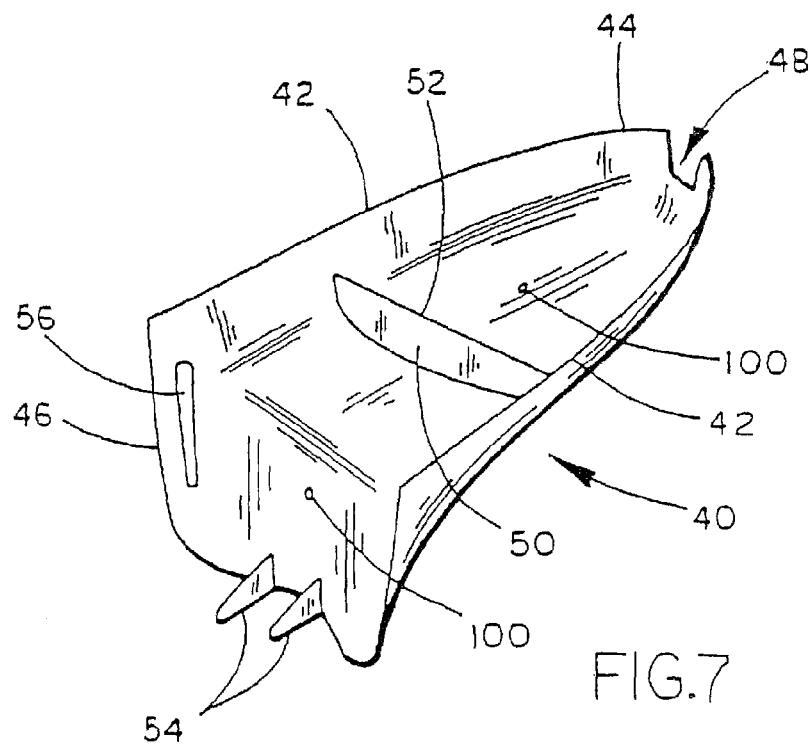
FIG. 7 is a perspective view of the wiring cover forming part of the mirror assembly.

The assembly further includes a removable cover 40 which mates with the housing 10 around the opening 20a and extends along the windshield to the vehicle header 24. The cover 40, which is longitudinally symmetric, is moulded from a resilient, polymeric or plastics material and comprises a pair of opposite, substantially coplanar, longitudinal side edges 42, FIG. 7, which diverge from a relatively narrow rear end 44 of the cover 40 to a relative wide flared front end 46. The flared front end 46 of the cover is open, and there is also a small opening 48 at the narrow rear end 44. The cover 40 has an internal strengthening wall 50 whose free edge 52 is recessed below the level of the edges 42. At its flared front end the cover 40 has a pair of forward projections 54, and the inside surface of the cover has a pair of raised ridges 56 (only one is seen in FIG. 7) each extending along a respective side of the cover adjacent to the front end 46.

The exterior surface of the housing 10 has a corresponding pair of elongated grooves or depressions 58 along each side of the opening 20a, the exterior width of the housing across the opening 20a being substantially the same as the interior width of the cover 40 across the grooves 58.

Figure 5:
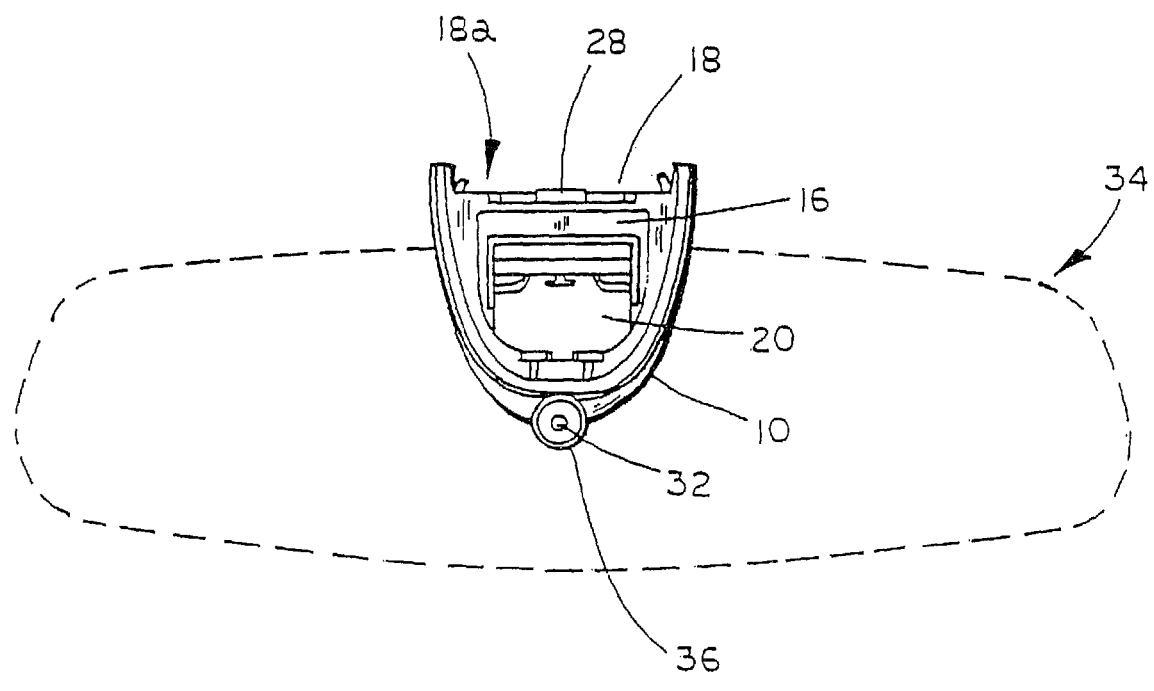
FIG. 5 is a view of the mirror assembly of FIG. 3 looking into the opening 20.
Figure 6:
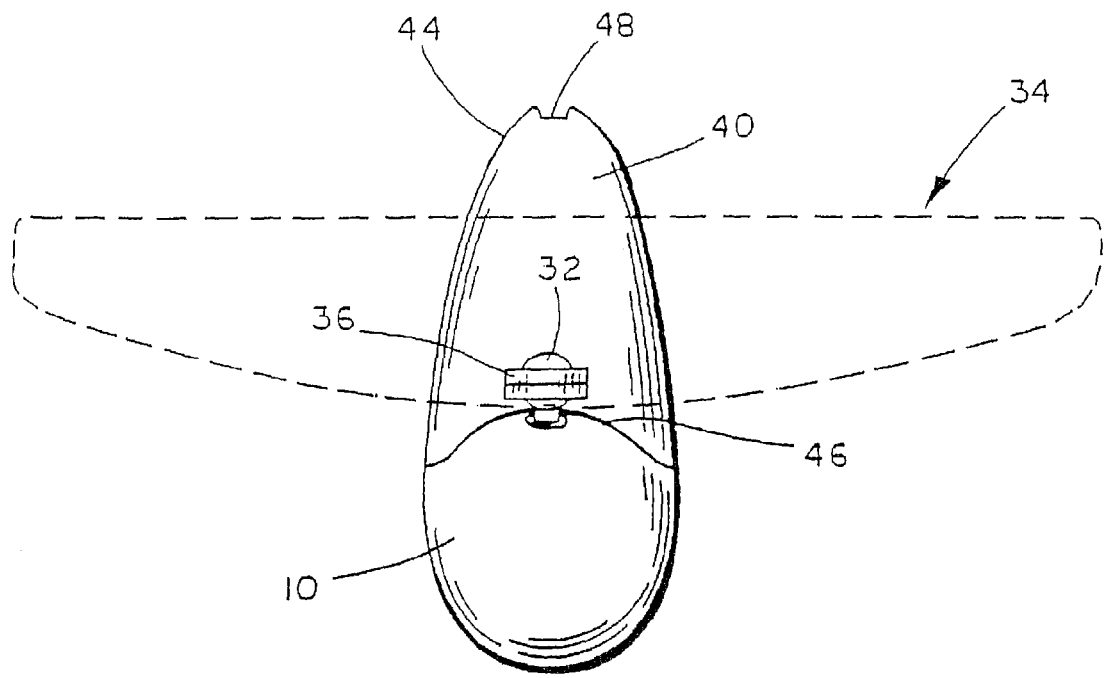
FIG. 6 is a view of the mirror assembly of FIG. 3 looking from underneath.

The cover 40 is fitted to the housing 10 by first inserting the projections 54 into a recess 60, FIGS. 2 and 5, above the opening 20a and then rotating the cover towards the windshield until the ribs 56 snap-engage the grooves 58 (the cover 40 is sufficiently resilient to permit this) and the edges 42 of the cover come to lie flat against the interior surface of the windshield 22, as seen in FIGS. 1 and 2. The cover 40 may be removed by pulling the narrow end 44 away from the windshield until the ribs 56 disengage the grooves 58 and then withdrawing the projection 54 from the recess 60.

The cover 40 serves a dual purpose. First, it protects the compartment 20a and hence the component 30 against the ingress of dust and other contaminants, yet it is easily removed to allow the component 30 to be serviced or replaced, if necessary after removing the mirror unit 34. Secondly, it provides a conduit for electrical leads 62, 64 and 66 respectively from the rain sensor 26, component 30 and (if fitted) the electro-optic or other electrically operated mirror 38.

As seen in FIG. 1, these leads are routed under the cover 40 and through the opening 48 at the rear end 44 of the cover into the vehicle header 24 where they are connected into the vehicle electrical system.

As clearly shown in FIG. 2, the ball joint 32 includes a passageway or a conduit through which can pass the electrical leads connecting to a component such as a eletrochromic mirror element 38 or compass display in the mirror head 34. In particular, there is shown a lead 68 connected to a compass display 70 which displays through the mirror element. Alternatively, the display 70 can be located at other positions in the interior rear view mirror assembly, such as in a chin portion or in an eyebrow portion.

Optionally, the removable cover includes at least one opening 100 or port through which a pointed object such as the tip of a ball point pen or a needle or the like can be inserted to activate switches on a PCB located in one of the compartments. Thus, for example, the zone and/or the calibration of a compass PCB can be adjusted without the necessity to remove the removable cover.

Figure 8:
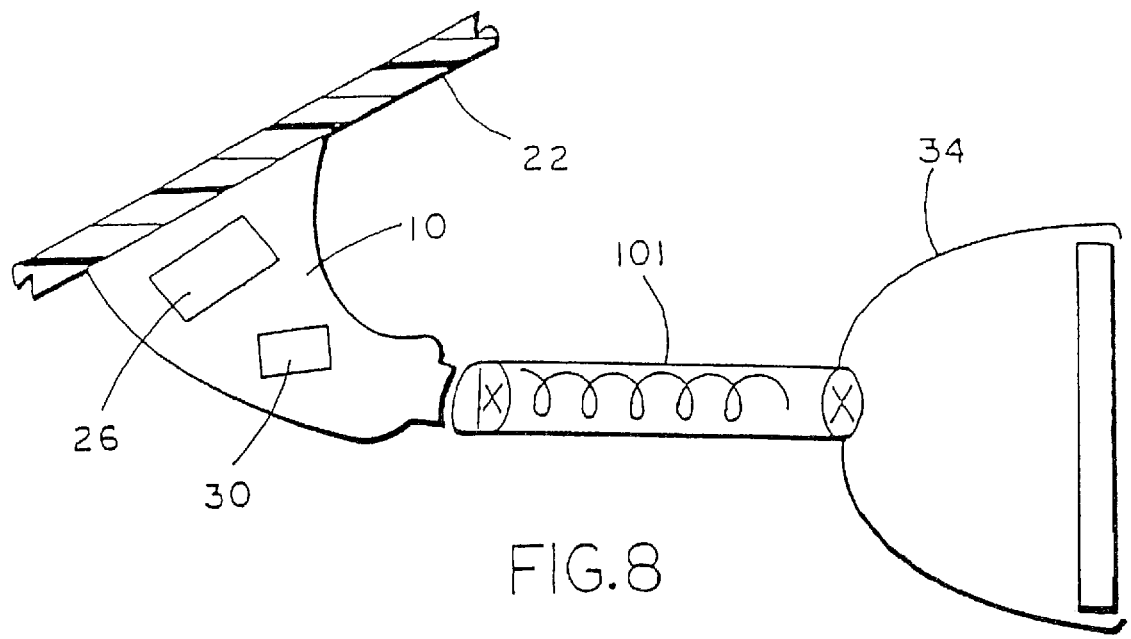
FIG. 8 is a schematic view of another embodiment of vehicle interior mirror assembly according to the invention.
Figure 9:
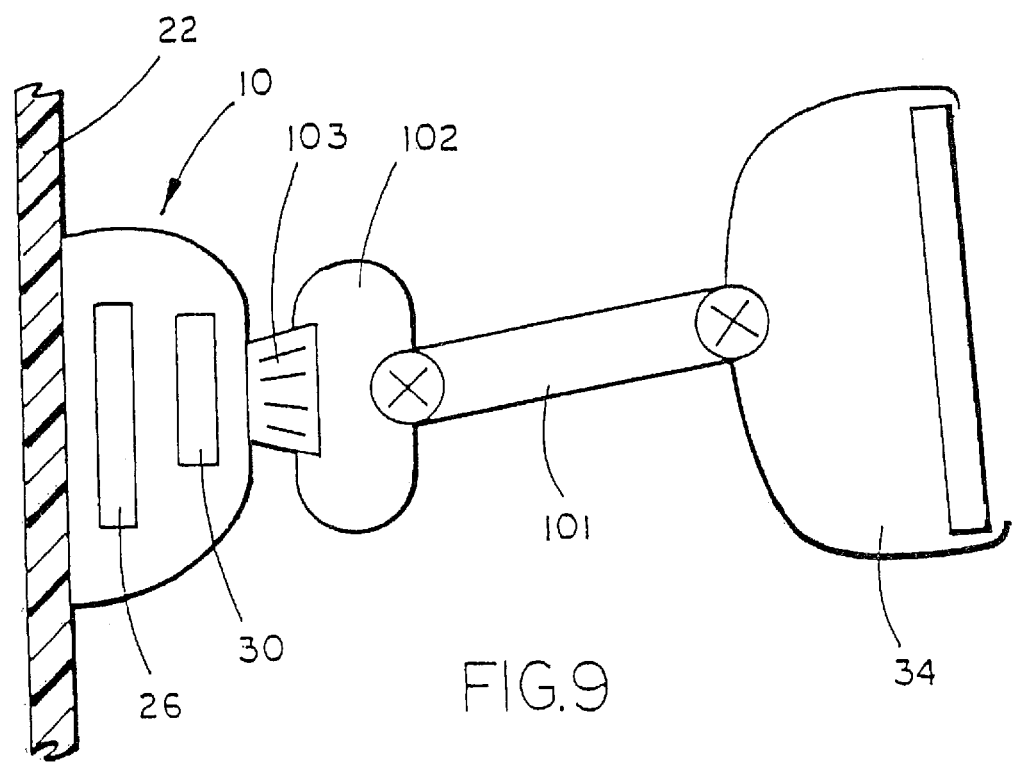
FIG. 9 is a schematic view of yet a further embodiment of a vehicle into rear mirror assembly according to the invention.

Also, a camera may be located on the assembly for example on the housing, or mirror unit or cover and arranged to look either forwardly or rearwardly in terms of the direction of motion of the vehicle, or in another desired direction. In FIGS. 8 and 9 there is shown schematic views of other embodiments of the invention. Thus, in FIG. 8 there is shown the housing 10 containing a rain sensor 26 and another electrical component for example a printed circuit board of a compass sensor 30, with the housing attached to the vehicle windshield 22. The mirror unit 34 is adjustably attached to the housing 10 by a double ball adjustable mirror support arm 101.

In FIG. 9, the mirror support arm 101 is attached to a mirror assembly mount 102. The housing 10 also comprises a mirror assembly mount button 103 which may be fixed to the housing 10 or integrally formed therewith. The mount 102 is detachably attached to the mirror assembly mount button 103.

Although the component 30 has been described as a compass sensor PCB, it can be any of a number of sensors or circuits which can be made small enough to fit in the compartment 20. Preferably, component 30 is provided as a unitary module that is received within compartment 20. Most preferably, component 30 is electrically connected with the electric/electronic wiring provided to the rear view mirror assembly. Thus, an electronic accessory can be provided as a module, can be inserted and received in the rear view mirror assembly, and can make electrical connection (such as by a plug and socket to the rear view mirror assembly). This facilitates and enables the manufacture and supply of the rear view mirror assembly, by a mirror assembly manufacturer, to a vehicle assembly line, and the separate manufacture and supply of the electrical/electronic module to that vehicle assembly line, with the automaker conveniently inserting the electric/electronic module into the compartment of the rear view mirror assembly when the rear view mirror assembly is being mounted on a vehicle passing down a vehicle assembly line.

For example, the compartment 20 may contain a sensor or sensors for vehicle altitude and/or incline, seat occupancy or air bag activation enable/disable, or (if a viewing aperture is made in the housing 10) photosensors for headlamp intensity/daylight intensity measurement. Alternatively, the compartment 20 may contain a transmitter and/or receiver, along with any associated sensors, for geographic positioning satellite (GPS) systems, pagers, cellular phone systems, ONSTAR™ wireless communication, systems, vehicle speed governors, security systems, tire monitoring systems, remote fueling systems where vehicle fueling and/or payment/charging for fuel is remotely achieved, remote keyless entry systems, garage and/or security door opener systems, INTERNET interfaces, vehicle tracking systems, remote car door unlock systems, e-mail systems, toll booth interactions systems, highway information systems, traffic warning systems, home access systems, garage door openers and the like. Of course, any of the above may be mounted under the cover 40, in addition to the component 30 in the compartment 20.

Where the component 30 is a transmitter or receiver, or where a further component mounted under the cover 40 is a transmitter or receiver, the cover 40 may include an associated antenna. The antenna may mounted as a separate item under the cover 40, or the cover itself may serve as the antenna, being either coated with a layer of conductive material or moulded from a conductive plastics material.

Also, a photosensor may be included in a compartment of the housing, preferably a skyward facing photosensor that views skyward through the vehicle windshield for the purpose of providing automatic headlamp activation/deactivation at dusk/dawn. Also, the housing may include a single microphone or a plurality of microphones for detecting vocal inputs from vehicle occupants for the purpose of cellular phone wireless communication.

Most preferably such microphones provide input to an audio system that transmits and communicates wirelessly with a remote transceiver, preferably in voice recognition mode. Such systems are described in commonly assigned, U.S. patent application Ser. No. 09/382,720, filed Aug. 25, 1999, now U.S. Pat. No. 6,243,003, the disclosure of which is hereby incorporated by reference herein.

In this regard it may be desirable to use audio processing techniques such as digital sound processing to ensure that vocal inputs to the vehicular audio system are clearly distinguished from cabin ambient noise such as from wind noise, HVAC, and the like.

Preferably the housing includes an analog to digital converter and or a digital analog converter for the purpose of converting the analog output of the microphone to a digital signal for input to a digital sound processor and for conversion of the digital output of a digital sound processor to an analog signal for wireless transmission to a remote transceiver.

The housing may include a variety of information displays such as a PSIR (Passenger Side Inflatable Restraint) display, an SIR (Side-Airbag Inflatable Restraint), compass/temperature display, a tire pressure status display or other desirable displays, such as those described in commonly assigned, U.S. patent application Ser. No. 09/244,726, filed Feb. 5, 1999, now U.S. Pat. No. 6,172,613, the disclosure of which is hereby incorporated by reference herein.

For example, the interior rearview mirror assembly may include a display of the speed limit applicable to the location where the vehicle is travelling. Conventionally, speed limits are posted as a fixed limit (for example, 45 MPH) that is read by the vehicle driver upon passing a sign. As an improvement to this, an information display (preferably an alphanumerical display and more preferably, a reconfigurable display) can be provided within the vehicle cabin, readable by the driver, that displays the speed limit at whatever location on the road/ highway the vehicle actually is at any moment. For example, existing speed limit signs could be enhanced to include a transmitter that broadcasts a local speed limit signal, such signal being received by an in-vehicle receiver and displayed to the driver. The speed limit signal can be transmitted by a variety of wireless transmission methods, such as radio transmission, and such systems can benefit from wireless transmission protocols and standards, such as the BLUETOOTH low-cost, low-power radio based cable replacement or wireless link based on short-range radio-based technology. Preferably, the in-vehicle receiver is located at and/or the display of local speed limit is displayed at the interior mirror assembly (for example, a speed limit display can be located in a chin or eyebrow portion of the mirror case, such as in the mirror reflector itself, such as in the cover 40, or such as in a pod attached to the interior mirror assembly). More preferably, the actual speed of the vehicle can be displayed simultaneously with and beside the local speed limit in-vehicle display and/or the difference or excess thereto can be displayed, Optionally, the wireless-based speed limit transmission system can actually control the speed at which a subject vehicle travels in a certain location (such as by controlling an engine governor or the like). Thus, a school zone speed limit can be enforced by transmission of a speed-limiting signal into the vehicle. Likewise, different speed limits for the same stretch of highway can be set for different classes of vehicles. The system may also require driver identification and then set individual speed limits for individual drivers reflecting their skill level, age, driving record and the like. Moreover, a global positioning system (GPS) can be used to locate a specific vehicle, calculate its velocity on the highway, verify what the allowed speed limit is at that specific moment on that specific stretch of highway, transmit that specific speed limit to the vehicle for display (preferably at the interior rearview mirror that the driver constantly looks at as part of the driving task) and optionally alert the driver or retard the driver's ability to exceed the speed limit as deemed appropriate. A short-range, local communication system such as envisaged in the BLUETOOTH protocol finds broad utility in vehicular applications, and particularly where information is to be displayed at the interior mirror assembly, or where a microphone or user-interface (such as buttons to connect/interact with a remote wireless receiver) is to be located at the interior (or exterior) rearview mirror assembly. For example, a train approaching a railway crossing may transmit a wireless signal such as a radio signal (using the BLUETOOTH protocol or another protocol) and that signal may be received by and/or displayed at the interior rearview mirror assembly (or the exterior side-view mirror assembly). Also, the interior rearview mirror and/or the exterior side view mirrors can function as transceivers/display locations/interface locations for intelligent vehicle highway systems, using protocols such as the BLUETOOTH protocol. Protocols such as BLUETOOTH, as known in the telecommunications art, can facilitate voice/ data, voice over data, digital and analogue communication and vehicle/external wireless connectivity, preferably using the interior and/or exterior mirror assemblies as transceiver/ display/user-interaction sites. Electronic accessories to achieve the above can be accommodated in housing 10, and/ or elsewhere in the interior mirror assembly (such as in the mirror housing). Examples of such electronic accessories include in-vehicle computers, personal organizers/palm computers such as the Palm Pilot™ personal display accessory (PDA), cellular phones and pagers, remote transaction interfaces/systems such as described in commonly assigned, U.S. patent application Ser. No. 09/057,428, filed Apr. 8, 1998, now U.S. Pat. No, 6,158,655, the disclosure of which is hereby incorporated by reference herein, automatic toll booth payment systems, GPS systems, e-mail receivers/displays, a videophone, vehicle security systems, digital radio station transmission to the vehicle by wireless communication as an alternate to having an in-vehicle dedicated conventional radio receiver, traffic/weather broadcast to the vehicle, preferably digitally, and audio play and/or video display thereof in the vehicle, most preferably at the interior rearview mirror, highway hazard warning systems and the like.

The information display at the interior rearview mirror assembly (such as at the mirror housing or viewable in the mirror reflector) may be formed using electronic ink technology and can be reconfigurable. Examples of electronic ink technology include small plastic capsules or microcapsules, typically $\frac{1}{10}$ of a millimeter across or thereabouts, that are filled with a dark ink and that have in that ink white particles which carry a charge such as a positive charge. Electrodes place an electric field across the capsules and the electric field can attract or repel the charged particles in the capsules. If the white particle is attracted to the top of a capsule so that it is closest to a viewer, the display element/pixel appears white to the viewer. If the white particle is attracted to the bottom of the capsule (away from the viewer), the display element/pixel appears dark as the viewer now sees the dark ink in the capsule. Such displays are available from E Ink of Cambridge, Mass. Such electronic ink displays have the advantage of forming text or graphics that, once formed, do not disappear when the display powering voltage is disconnected (i.e. they have a long display memory). Alternately, GYRICON™ electronic ink technology developed by XEROX Corporation can be used. Here, microbeads are used that are black (or another dark color) on one side and white (or another light color) on the other side. The beads are dipolar in that one hemisphere carries a stronger (and hence different) charge than the opposing other hemisphere. The beads are small (about $\frac{1}{10}$th of a millimeter diameter) and turn or flip when placed in an electric field, with the respective poles of the dipolar beads being attracted to the corresponding polarity of the applied electric field. Thus, a white pixel or a black pixel can be electrically written. Once the bead has turned or flipped, it remains turned or flipped unless an electric potential of the opposite polarity is applied. Thus, the display has memory.

Other types of information displays can be used at the interior mirror location. For example, a field-emission display such as the field-emission display available from Candescent Technologies of San Jose, Calif. can be used. Field-emission displays include a plurality of charge emitting sources or guns that bombard a phosphor screen. For example, a myriad of small or microscopic cones (<1 micron tall, for example and made of a metal such as molybdenum) are placed about a millimeter from phosphors on a screen. The cones emit electrons from their tips or apexes to bombard the phosphors under an applied electric field. This technology is adaptable to provide thin display screens (such as less than 10 mm or so). Alternately, field-emission displays can be made using carbon nanotubes which are cylindrical versions of buckminsterfullerene, and available from Motorola. Such field-emission displays are particularly useful for video displays as they have high brightness and good contrast ratio, even under high ambient lighting conditions such as in a vehicle cabin by day. Such displays can be located at the interior rearview mirror, preferably, or optionally elsewhere in the vehicle cabin such as in the dash, in the windshield header at the top interior edge of the windshield, in a seat back, or the like.

A further advantage of providing a housing 10 which accommodates multiple electrical accessories, preferably in individual compartments, is that incorporation of optional accessories into a specific vehicle is facilitated. It also facilitates supply of the housing 10 and associated mirror unit by a mirror manufacturer and supply of at least one of the electrical accessories by a second, different accessory manufacturer, and with the automaker placing the at least one electrical accessory into the housing 10 at the vehicle assembly plant, preferably at the vehicle assembly line. Thus, for example, an interior mirror assembly can be manufactured by a mirror supplier that includes housing 10, compartments 18 and 20 (or, optionally, more compartments), printed circuit board 30 (such as a compass sensor printed circuit board) in compartment 20 but with compartment 18 empty, removable cover 40, a mirror support arm articulating about housing 20, a mirror housing or case supported on said support arm, a reflector element in said mirror housing (preferably an electrochromic mirror element which includes an information display such as of compass direction and/or temperature displaying through said mirror element as is known in the mirror arts). A rain sensor module can be made by a separate manufacturer. The rain sensor module and the interior mirror assembly can be shipped to a vehicle assembly plant (or local to it). Then, when a particular vehicle requires a rains sensor module, the vehicle manufacturer can place the rain sensor module into compartment 18, connect the rain sensor module to the wire harness provided to mirror assembly (preferably, the rain sensor module docks into compartment 18 in a manner that connects it electrically to the vehicle or alternatively, the rain sensor module includes a plug or socket that connects to a corresponding socket or plug already provided in housing 10 (or elsewhere on the interior mirror assembly). This allows "plug & play" accommodation of multiple accessories into the interior rearview mirror assembly. Also, the interior rearview mirror assembly may be shipped to the assembly plant with both compartments 18 and 20 empty, thus allowing, for example, the automaker to solely place a rain sensor module into compartment 18 but add no further accessory into compartment 20.

The invention is not limited to the embodiments described herein which may be modified or varied without departing from the scope of the invention.

The invention claimed is:

1. An interior rearview mirror system for a vehicle, said interior rearview mirror system comprising:
   an attachment element adhesively attached at an in-cabin surface of a vehicle windshield of a vehicle equipped with said interior rearview mirror system;
   a single-ball interior rearview mirror assembly configured for attachment at said attachment element;
   wherein said interior rearview mirror assembly comprises a housing and an interior rearview mirror head pivotable about said housing by a single ball and socket pivot joint, said single ball and socket joint comprising a ball pivot element and a socket pivot element;
   wherein said housing includes a mount for attaching said interior rearview mirror assembly at said attachment element;
   wherein said housing includes one of said ball pivot element and said socket pivot element of said single ball and socket pivot joint and wherein said interior rearview mirror head includes the other of said ball pivot element and said socket pivot element of said single ball and socket pivot joint;
   wherein said interior rearview mirror head includes an electrochromic rearview mirror element;
   wherein, with said interior rearview mirror assembly attached at said attachment element, said interior rearview mirror head is adjustable by a driver of the equipped vehicle about said single ball and socket pivot joint to adjust a rearward field of view of said electrochromic rearview mirror element;
   wherein said housing houses a forwardly-viewing camera and wherein, with said interior rearview mirror assembly attached at said attachment element, said forwardly-viewing camera views through the vehicle windshield;
   wherein said housing houses circuitry;
   wherein said circuitry at least one of (a) receives an input via a bus communication and (b) delivers an output via a bus communication;
   wherein said attachment element comprises a mirror mounting button and wherein said mirror mounting button comprises an outer portion and an inner open central portion; and
   wherein a rain sensor is disposed at said inner open central portion of said mirror mounting button and views, via said inner open central portion of said mirror mounting button, through the vehicle windshield.

2. The interior rearview mirror system of claim 1, wherein said circuitry comprises at least a part of a control of at least one of (a) a braking system of the equipped vehicle and (b) a traction control system of the equipped vehicle.

3. The interior rearview mirror system of claim 2, wherein said control provides, at least in part, adjustment of a braking characteristic of a braking system of the equipped vehicle.

4. The interior rearview mirror system of claim 2, wherein said control provides, at least in part, adjustment of a traction characteristic of a traction control system of the equipped vehicle.

5. The interior rearview mirror system of claim 1, wherein said housing comprises one of (i) a polymeric housing and (ii) a metallic housing.

6. The interior rearview mirror system of claim 1, wherein said interior rearview mirror system comprises a cover.

7. The interior rearview mirror system of claim 6, wherein said cover is configured for attachment at said housing.

8. The interior rearview mirror system of claim 7, wherein said cover comprises a polymeric cover.

9. The interior rearview mirror system of claim 7, wherein said cover comprises a detachable cover configured for detachable attachment at said housing.

10. The interior rearview mirror system of claim 7, wherein, with said interior rearview mirror assembly attached at said attachment element, said cover, when attached at said housing, substantially conceals the presence of said forwardly-viewing camera from view by the driver normally operating the equipped vehicle.

11. The interior rearview mirror system of claim 6, wherein said cover provides protection against ingress of a contaminant.

12. The interior rearview mirror system of claim 6, wherein said cover provides a conduit for electrical leads associated with at least one of (i) circuitry disposed in said housing and (ii) circuitry disposed in said interior rearview mirror head.

13. The interior rearview mirror system of claim 6, wherein said housing comprises a metallic housing, and wherein said cover attaches at said metallic housing.

14. The interior rearview mirror system of claim 13, wherein said metallic housing comprises a die cast metallic housing.

15. The interior rearview mirror system of claim 13, wherein, with said interior rearview mirror assembly attached at said attachment element, said rain sensor is at least partially hidden by said cover from view by the driver operating the equipped vehicle.

16. The interior rearview mirror system of claim 6, wherein, with said interior rearview mirror assembly attached at said attachment element, said cover is detachable to facilitate service.

17. The interior rearview mirror system of claim 6, wherein said housing houses a cluster of individual sensors and wherein, with said interior rearview mirror assembly attached at said attachment element, said cluster of individual sensors resides on or near the in-cabin surface of the vehicle windshield.

18. The interior rearview mirror system of claim 17, wherein said cover at least partially hides said cluster of individual sensors from view by the driver operating the equipped vehicle.

19. The interior rearview mirror system of claim 1, wherein said housing includes said ball pivot element of said single ball and socket pivot joint and wherein said interior rearview mirror head includes said socket pivot element of said single ball and socket pivot joint.

20. The interior rearview mirror system of claim 1, wherein said single ball and socket pivot joint includes a passageway, and wherein at least one electrical lead passes through said passageway of said single ball and socket pivot joint.

21. The interior rearview mirror system of claim 20, wherein said at least one electrical lead connects to said rain sensor.

22. The interior rearview mirror system of claim 20, wherein said at least one electrical lead connects to circuitry disposed in said interior rearview mirror head.

23. The interior rearview mirror system of claim 22, wherein said circuitry disposed in said interior rearview mirror head is associated with said electrochromic rearview mirror element.

24. The interior rearview mirror system of claim 22, wherein said circuitry disposed in said interior rearview mirror head is associated with a display in said interior rearview mirror head that displays through said electrochromic mirror element.

25. The interior rearview mirror system of claim 1, wherein said forwardly-viewing camera is located on said housing.

26. The interior rearview mirror system of claim 1, wherein adjustment of said interior rearview mirror head to adjust the rearward field of view of said electrochromic rearview mirror element does not affect the position or orientation of said forwardly-viewing camera housed by said housing.

27. The interior rearview mirror system of claim 26, wherein said housing is fixedly attached at said attachment element.

28. The interior rearview mirror system of claim 27, wherein said housing is detachably attached at said attachment element.

29. The interior rearview mirror system of claim 27, wherein said attachment of said housing comprises a breakaway attachment.

30. The interior rearview mirror system of claim 1, wherein said housing houses at least one of (a) a headlamp sensor, (b) said rain sensor, (c) another camera, (d) a compass sensor, and (e) a garage door opener.

31. The interior rearview mirror system of claim 1, wherein said circuitry comprises, at least in part, circuitry of said rain sensor.

32. The interior rearview mirror system of claim 1, wherein said outer portion of said mirror mounting button comprises an annular outer portion.

33. The interior rearview mirror system of claim 1, wherein said rain sensor is optically coupled to the vehicle windshield.

34. The interior rearview mirror system of claim 1, wherein said rain sensor views through a light transmitting aperture established in a light absorbing hiding layer at the vehicle windshield that generally coincides with said inner open central portion of said mirror mounting button.

35. The interior rearview mirror system of claim 34, wherein said mount of said housing is configured to twist onto said attachment element to attach said interior rearview mirror assembly at said attachment element.

36. The interior rearview mirror system of claim 1, wherein said rain sensor at least one of (a) is urged at least partially through said inner open central portion of said mirror mounting button and into contact with the in-cabin surface of the vehicle windshield for viewing through the vehicle windshield, and (b) is urged at least partially through said inner open central portion of said mirror mounting button and into contact with the in-cabin surface of the vehicle windshield for viewing, via an opening in a light absorbing layer at the vehicle windshield that generally coincides with said inner open central portion of said mirror mounting button, through the vehicle windshield.

37. The interior rearview mirror system of claim 1, wherein said mount of said housing is configured to twist onto said attachment element to attach said interior rearview mirror assembly at said attachment element.

38. The interior rearview mirror system of claim 1, wherein said attachment element comprises a metallic mirror mounting button.

39. The interior rearview mirror system of claim 1, wherein said attachment element comprises a metallic mirror mounting button formed by at least one of casting and sintering.

40. The interior rearview mirror system of claim 1, wherein said attachment element comprises a polymeric mirror mounting button.

41. The interior rearview mirror system of claim 1, wherein said bus communication comprises a CAN bus communication.

42. The interior rearview mirror system of claim 1, wherein said housing includes an internal wall that separates a cavity of said housing into first and second compartments, and wherein said forwardly-viewing camera is accommodated by said first compartment.

43. An interior rearview mirror system for a vehicle, said interior rearview mirror system comprising:
an attachment element adhesively attached at an in-cabin surface of a vehicle windshield of a vehicle equipped with said interior rearview mirror system;
a single-ball interior rearview mirror assembly configured for attachment at said attachment element;

wherein said interior rearview mirror assembly comprises a housing and an interior rearview mirror head pivotable about said housing by a single ball and socket pivot joint, said single ball and socket joint comprising a ball pivot element and a socket pivot element;

wherein said housing includes a mount for attaching said interior rearview mirror assembly at said attachment element;

wherein said housing includes one of said ball pivot element and said socket pivot element of said single ball and socket pivot joint and wherein said interior rearview mirror head includes the other of said ball pivot element and said socket pivot element of said single ball and socket pivot joint;

wherein said interior rearview mirror head includes an electrochromic rearview mirror element;

wherein, with said interior rearview mirror assembly attached at said attachment element, said interior rearview mirror head is adjustable by a driver of the equipped vehicle about said single ball and socket pivot joint to adjust a rearward field of view of said electrochromic rearview mirror element;

wherein said single ball and socket pivot joint includes a passageway, and wherein at least one electrical lead passes through said passageway of said single ball and socket pivot joint;

wherein said at least one electrical lead connects to circuitry disposed in said interior rearview mirror head and wherein said circuitry is associated with said electrochromic rearview mirror element;

wherein said housing houses a forwardly-viewing camera and wherein, with said interior rearview mirror assembly attached at said attachment element, said forwardly-viewing camera views through the vehicle windshield;

wherein adjustment of said interior rearview mirror head to adjust the rearward field of view of said electrochromic rearview mirror element does not affect the position or orientation of said forwardly-viewing camera housed by said housing;

wherein said attachment element comprises a mirror mounting button and wherein said mirror mounting button comprises an outer portion and an inner open central portion; and wherein a rain sensor is disposed at said inner open central portion of said mirror mounting button and views through the vehicle windshield via said inner open central portion of said mirror mounting button and via a light transmitting aperture established in a light absorbing hiding layer at the vehicle windshield that generally coincides with said inner open central portion of said mirror mounting button.

44. The interior rearview mirror system of claim 43, wherein said interior rearview mirror system comprises a cover.

45. The interior rearview mirror system of claim 44, wherein said cover is configured for at least one of (a) attachment at said housing and (b) detachable attachment at said housing.

46. The interior rearview mirror system of claim 45, wherein, with said interior rearview mirror assembly attached at said attachment element, said cover substantially conceals the presence of said forwardly-viewing camera from view by the driver normally operating the equipped vehicle.

47. The interior rearview mirror system of claim 44, wherein said cover provides protection against ingress of a contaminant.

48. The interior rearview mirror system of claim 44, wherein said cover provides a conduit for at least one electrical lead associated with at least one of (i) circuitry disposed in said housing and (ii) said circuitry disposed in said interior rearview mirror head.

49. The interior rearview mirror system of claim 43, wherein at least one of (a) said rain sensor is optically coupled to the vehicle windshield, and (b) said mount of said housing is configured to twist onto said attachment element to attach said interior rearview mirror assembly at said attachment element.

50. The interior rearview mirror system of claim 43, wherein said rain sensor at least one of (a) is urged at least partially through said inner open central portion of said mirror mounting button and into contact with the in-cabin surface of the vehicle windshield, and (b) is urged at least partially through said inner open central portion of said mirror mounting button.

51. The interior rearview mirror system of claim 43, wherein said attachment element comprises one of (a) a metallic mirror mounting button and (b) a metallic mirror mounting button formed by at least one of casting and sintering.

52. The interior rearview mirror system of claim 43, wherein said housing comprises one of (a) a metallic housing and (b) a die cast metallic housing.

53. The interior rearview mirror system of claim 52, wherein, with said interior rearview mirror assembly attached at said attachment element, said rain sensor is at least partially hidden from view by the driver operating the equipped vehicle via a cover attached at said housing.

54. The interior rearview mirror system of claim 43, wherein said housing houses circuitry and wherein said circuitry housed by said housing at least one of (a) receives an input via a bus communication and (b) delivers an output via a bus communication.

55. An interior rearview mirror system for a vehicle, said interior rearview mirror system comprising:

an attachment element adhesively attached at an in-cabin surface of a vehicle windshield of a vehicle equipped with said interior rearview mirror system;

a single-ball interior rearview mirror assembly configured for attachment at said attachment element;

wherein said interior rearview mirror assembly comprises a housing and an interior rearview mirror head pivotable about said housing by a single ball and socket pivot joint, said single ball and socket joint comprising a ball pivot element and a socket pivot element;

wherein said housing includes a mount for attaching said interior rearview mirror assembly at said attachment element;

wherein said housing includes one of said ball pivot element and said socket pivot element of said single ball and socket pivot joint and wherein said interior rearview mirror head includes the other of said ball pivot element and said socket pivot element of said single ball and socket pivot joint;

wherein said interior rearview mirror head includes an electrochromic rearview mirror element;

wherein, with said interior rearview mirror assembly attached at said attachment element, said interior rearview mirror head is adjustable by a driver of the equipped vehicle about said single ball and socket pivot joint to adjust a rearward field of view of said electrochromic rearview mirror element;

wherein said single ball and socket pivot joint includes a passageway, and wherein at least one electrical lead passes through said passageway of said single ball and socket pivot joint;

wherein said at least one electrical lead connects to circuitry disposed in said interior rearview mirror head and wherein said circuitry is associated with said electrochromic rearview mirror element;

wherein said housing houses a forwardly-viewing camera and wherein, with said interior rearview mirror assembly attached at said attachment element, said forwardly-viewing camera views through the vehicle windshield;

wherein adjustment of said interior rearview mirror head to adjust the rearward field of view of said electrochromic rearview mirror element does not affect the position or orientation of said forwardly-viewing camera housed by said housing;

wherein said attachment element comprises a mirror mounting button and wherein said mirror mounting button comprises an outer portion and an inner open central portion;

wherein a rain sensor is disposed at said inner open central portion of said mirror mounting button and views through the vehicle windshield via said inner open central portion of said mirror mounting button and via a light transmitting aperture established in a light absorbing hiding layer at the vehicle windshield that generally coincides with said inner open central portion of said mirror mounting button; and wherein said rain sensor is in contact with the in-cabin surface of the vehicle windshield through said inner open central portion of said mirror mounting button.

56. The interior rearview mirror system of claim 55, wherein said mount of said housing is configured to twist onto said attachment element to attach said interior rearview mirror assembly at said attachment element.

57. The interior rearview mirror system of claim 56, wherein said outer portion of said mirror mounting button comprises an annular outer portion.

58. The interior rearview mirror system of claim 55, wherein said rain sensor is urged into contact with the in-cabin surface of the vehicle windshield by a resilient member.

59. The interior rearview mirror system of claim 55, wherein said housing includes said ball pivot element of said single ball and socket pivot joint and wherein said interior rearview mirror head includes said socket pivot element of said single ball and socket pivot joint.

60. The interior rearview mirror system of claim 59, wherein said housing comprises a metallic housing.

61. The interior rearview mirror system of claim 60, wherein said metallic housing comprises a die cast metallic housing.

62. The interior rearview mirror system of claim 55, wherein said forwardly-viewing camera is located on said housing.

63. The interior rearview mirror system of claim 62, wherein said interior rearview mirror system comprises a cover.

64. The interior rearview mirror system of claim 63, wherein said cover is configured for at least one of (a) attachment at said housing and (b) detachable attachment at said housing.

65. The interior rearview mirror system of claim 63, wherein, with said interior rearview mirror assembly attached at said attachment element, said cover substantially conceals the presence of said forwardly-viewing camera from view by the driver normally operating the equipped vehicle.

66. An interior rearview mirror system for a vehicle, said interior rearview mirror system comprising:

an attachment element adhesively attached at an in-cabin surface of a vehicle windshield of a vehicle equipped with said interior rearview mirror system;

a single-ball interior rearview mirror assembly configured for attachment at said attachment element;

wherein said interior rearview mirror assembly comprises a housing and an interior rearview mirror head pivotable about said housing by a single ball and socket pivot joint, said single ball and socket joint comprising a ball pivot element and a socket pivot element;

wherein said housing includes a mount for attaching said interior rearview mirror assembly at said attachment element and wherein said mount of said housing is configured to twist onto said attachment element to attach said interior rearview mirror assembly at said attachment element;

wherein said housing includes one of said ball pivot element and said socket pivot element of said single ball and socket pivot joint and wherein said interior rearview mirror head includes the other of said ball pivot element and said socket pivot element of said single ball and socket pivot joint;

wherein said interior rearview mirror head includes an electrochromic rearview mirror element;

wherein, with said interior rearview mirror assembly attached at said attachment element, said interior rearview mirror head is adjustable by a driver of the equipped vehicle about said single ball and socket pivot joint to adjust a rearward field of view of said electrochromic rearview mirror element;

wherein said single ball and socket pivot joint includes a passageway, and wherein at least one electrical lead passes through said passageway of said single ball and socket pivot joint;

wherein said at least one electrical lead connects to circuitry disposed in said interior rearview mirror head and wherein said circuitry is associated with said electrochromic rearview mirror element;

wherein said housing houses a forwardly-viewing camera and wherein, with said interior rearview mirror assembly attached at said attachment element, said forwardly-viewing camera views through the vehicle windshield;

wherein adjustment of said interior rearview mirror head to adjust the rearward field of view of said electrochromic rearview mirror element does not affect the position or orientation of said forwardly-viewing camera housed by said housing;

wherein said attachment element comprises a mirror mounting button and wherein said mirror mounting button comprises an annular outer portion and an inner open central portion;

wherein a rain sensor is disposed at said inner open central portion of said mirror mounting button and views through the vehicle windshield via said inner open central portion of said mirror mounting button and via a light transmitting aperture established in a light absorbing hiding layer at the vehicle windshield that generally coincides with said inner open central portion of said mirror mounting button; and wherein said rain sensor is in contact with the in-cabin surface of the vehicle windshield through said inner open central portion of said mirror mounting button, and wherein said rain sensor is urged into contact with the in-cabin surface of the vehicle windshield by a resilient member.

67. The interior rearview mirror system of claim 66, wherein said housing comprises at least one of (a) a metallic housing and (b) a die cast metallic housing.

68. The interior rearview mirror system of claim 67, wherein said forwardly-viewing camera is located on said housing.

69. The interior rearview mirror system of claim 68, wherein said interior rearview mirror system comprises a cover, and wherein said cover is configured for at least one of (a) attachment at said housing and (b) detachable attachment at said housing.

70. An interior rearview mirror system for a vehicle, said interior rearview mirror system comprising:

an attachment element adhesively attached at an in-cabin surface of a vehicle windshield of a vehicle equipped with said interior rearview mirror system;

a single-ball interior rearview mirror assembly configured for attachment at said attachment element;

wherein said interior rearview mirror assembly comprises a housing and an interior rearview mirror head pivotable about said housing by a single ball and socket pivot joint, said single ball and socket joint comprising a ball pivot element and a socket pivot element;

wherein said housing includes a mount for attaching said interior rearview mirror assembly at said attachment element and wherein said mount of said housing is configured to twist onto said attachment element to attach said interior rearview mirror assembly at said attachment element;

wherein said housing includes one of said ball pivot element and said socket pivot element of said single ball and socket pivot joint and wherein said interior rearview mirror head includes the other of said ball pivot element and said socket pivot element of said single ball and socket pivot joint;

wherein said interior rearview mirror head includes an electrochromic rearview mirror element;

wherein, with said interior rearview mirror assembly attached at said attachment element, said interior rearview mirror head is adjustable by a driver of the equipped vehicle about said single ball and socket pivot joint to adjust a rearward field of view of said electrochromic rearview mirror element;

wherein said single ball and socket pivot joint includes a passageway, and wherein at least one electrical lead passes through said passageway of said single ball and socket pivot joint;

wherein said at least one electrical lead connects to circuitry disposed in said interior rearview mirror head and wherein said circuitry is associated with said electrochromic rearview mirror element;

wherein said housing houses a forwardly-viewing camera and wherein, with said interior rearview mirror assembly attached at said attachment element, said forwardly-viewing camera views through the vehicle windshield;

wherein said forwardly-viewing camera is located on said housing;

wherein adjustment of said interior rearview mirror head to adjust the rearward field of view of said electrochromic rearview mirror element does not affect the position or orientation of said forwardly-viewing camera housed by said housing;

wherein said housing houses circuitry;

wherein said circuitry at least one of (a) receives an input via a bus communication and (b) delivers an output via a bus communication;

wherein said interior rearview mirror system comprises a cover, and wherein said cover is configured for at least one of (a) attachment at said housing and (b) detachable attachment at said housing;

wherein said attachment element comprises a mirror mounting button and wherein said mirror mounting button comprises an annular outer portion and an inner open central portion;

wherein a rain sensor is disposed at said inner open central portion of said mirror mounting button and views through the vehicle windshield via said inner open central portion of said mirror mounting button and via a light transmitting aperture established in a light absorbing hiding layer at the vehicle windshield that generally coincides with said inner open central portion of said mirror mounting button; and wherein said rain sensor is in contact with the in-cabin surface of the vehicle windshield through said inner open central portion of said mirror mounting button, and wherein said rain sensor is urged into contact with the in-cabin surface of the vehicle windshield by a resilient member.

71. An interior rearview mirror system for a vehicle, said interior rearview mirror system comprising:

an attachment element adhesively attached at an in-cabin surface of a vehicle windshield of a vehicle equipped with said interior rearview mirror system;

a single-ball interior rearview mirror assembly configured for attachment at said attachment element;

wherein said interior rearview mirror assembly comprises a housing and an interior rearview mirror head pivotable about said housing by a single ball and socket pivot joint, said single ball and socket joint comprising a ball pivot element and a socket pivot element;

wherein said housing includes a mount for attaching said interior rearview mirror assembly at said attachment element;

wherein said housing includes said ball pivot element of said single ball and socket pivot joint;

wherein said interior rearview mirror head includes an electrochromic rearview mirror element;

wherein, with said interior rearview mirror assembly attached at said attachment element, said interior rearview mirror head is adjustable by a driver of the equipped vehicle about said single ball and socket pivot joint to adjust a rearward field of view of said electrochromic rearview mirror element;

wherein said housing houses a forwardly-viewing camera and wherein, with said interior rearview mirror assembly attached at said attachment element, said forwardly-viewing camera views through the vehicle windshield;

wherein said assembly houses circuitry;

wherein said circuitry at least one of (a) receives an input via a bus communication and (b) delivers an output via a bus communication;

wherein said attachment element comprises a mirror mounting button and wherein said mirror mounting button comprises an outer portion and an inner open central portion;

wherein a rain sensor is disposed at said inner open central portion of said mirror mounting button and views, via said inner open central portion of said mirror mounting button, through the vehicle windshield;

wherein said single ball and socket pivot joint includes a passageway, and wherein at least one electrical lead passes through said passageway of said single ball and socket pivot joint;

wherein said at least one electrical lead connects to circuitry disposed in said interior rearview mirror head;

wherein said mount of said housing is configured to twist onto said attachment element to attach said interior rearview mirror assembly at said attachment element;

wherein said attachment element comprises a metallic mirror mounting button; and wherein adjustment of said interior rearview mirror head to adjust the rearward field of view of said electrochromic rearview mirror element does not affect the position or orientation of said forwardly-viewing camera housed by said housing.

72. The interior rearview mirror system of claim 71, wherein circuitry disposed in said interior rearview mirror head is associated with at least one of (i) said electrochromic rearview mirror element and (ii) a display in said interior rearview mirror head that displays through said electrochromic mirror element.

73. The interior rearview mirror system of claim 72, wherein said forwardly-viewing camera is located on said housing.

74. The interior rearview mirror system of claim 73, wherein attachment of said single-ball interior rearview mirror assembly at said attachment element comprises a breakaway attachment.

75. The interior rearview mirror system of claim 74, wherein said metallic mirror mounting button is formed by at least one of casting and sintering and wherein said housing comprises at least one of (i) a metallic housing and (ii) a die-cast metallic housing.

76. The interior rearview mirror system of claim 75, wherein said interior rearview mirror system comprises a cover and wherein, with said interior rearview mirror assembly attached at said attachment element, said cover substantially conceals the presence of said forwardly-viewing camera from view by the driver normally operating the equipped vehicle.

77. The interior rearview mirror system of claim 76, wherein said cover comprises a polymeric cover and wherein said cover is configured for detachable attachment at said housing.

78. The interior rearview mirror system of claim 77, wherein said interior rearview mirror head includes said socket pivot element of said single ball and socket pivot joint and wherein said bus communication comprises a CAN bus communication.

79. The interior rearview mirror system of claim 78, wherein said rain sensor views through a light transmitting aperture established in a light absorbing hiding layer at the vehicle windshield that generally coincides with said inner open central portion of said mirror mounting button, and wherein said mirror mounting button comprises a circular mirror mounting button.

80. The interior rearview mirror system of claim 79, wherein said outer portion of said mirror mounting button comprises an annular outer portion and wherein said rain sensor makes contact with the in-cabin surface of the vehicle windshield through said inner open central portion of said mirror mounting.

81. The interior rearview mirror system of claim 80, wherein said circuitry that at least one of (a) receives an input via a bus communication and (b) delivers an output via a bus communication is housed at said housing.

\* \* \* \* \*

UNITED STATES PATENT AND TRADEMARK OFFICE
CERTIFICATE OF CORRECTION

PATENT NO. : 8,134,117 B2
APPLICATION NO. : 13/191802
DATED : March 13, 2012
INVENTOR(S) : Patrick Heslin and Niall R. Lynam It is certified that error appears in the above-identified patent and that said Letters Patent is hereby corrected as shown below:

Title Page, Item (54) and Column 1, lines 1-4,
The title should be:

VEHICULAR SYSTEM HAVING A CAMERA, A RAIN SENSOR AND A SINGLE-BALL INTERIOR ELECTROCHROMIC MIRROR ASSEMBLY ATTACHED AT AN ATTACHMENT ELEMENT

Column 3
Line 47, "fit" should be --frit--

Column 5
Lines 33-34, "member," should be --member.--

Column 6
Line 45, "at to/mirror" should be --arm/mirror--

Column 7
Line 5, Delete the space between "recess 60," and "FIGS. 2"

Column 9
Line 34, "displayed," should be --displayed.--

Column 10
Line 15, "No," should be --No.--

Signed and Sealed this
Twenty-eighth Day of August, 2012

David J. Kappos
*Director of the United States Patent and Trademark Office*